US012214825B2

(12) United States Patent
Shimizu et al.

(10) Patent No.: US 12,214,825 B2
(45) Date of Patent: Feb. 4, 2025

(54) FLANGED MEMBER

(71) Applicant: SUMITOMO HEAVY INDUSTRIES, LTD., Tokyo (JP)

(72) Inventors: Satoshi Shimizu, Ehime (JP);
Masayuki Ishizuka, Ehime (JP);
Masayuki Saika, Ehime (JP); Norieda Ueno, Ehime (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 345 days.

(21) Appl. No.: 17/745,531

(22) Filed: May 16, 2022

(65) Prior Publication Data

US 2022/0274651 A1   Sep. 1, 2022

Related U.S. Application Data

(63) Continuation of application No. PCT/JP2020/045851, filed on Dec. 9, 2020.

(30) Foreign Application Priority Data

Jan. 20, 2020   (JP) ................................ 2020-006717

(51) Int. Cl.
*B21D 26/047* (2011.01)
*B21D 22/02* (2006.01)
(Continued)

(52) U.S. Cl.
CPC ............. *B62D 25/08* (2013.01); *B21D 22/02* (2013.01); *B21D 26/047* (2013.01); *B21D 53/88* (2013.01);
(Continued)

(58) Field of Classification Search
CPC ...... B62D 25/08; B62D 25/14; B62D 29/007; B21D 22/02; B21D 26/047; B21D 53/88; F16L 9/003
See application file for complete search history.

(56) References Cited

U.S. PATENT DOCUMENTS 5,070,717 A    12/1991   Boyd et al.
5,431,326 A *   7/1995   Ni .......................... B21D 26/033
                                                              72/370.23
(Continued)

FOREIGN PATENT DOCUMENTS

DE   199 05 365 A1   8/2000
JP   2007-022214 A   2/2007
JP   2008-504162 A   2/2008

OTHER PUBLICATIONS

Search Report issued in European Application No. 20915462.4, dated Jun. 1, 2023.
(Continued)

*Primary Examiner* — David R Deal
(74) *Attorney, Agent, or Firm* — Michael Best & Friedrich LLP

(57) ABSTRACT

Provided is a flanged member that has a tubular shape and includes a flange portion, the flanged member including: a cross-section changing portion of which a cross-sectional shape changes along an axial direction of the flanged member, in which in any two cross-sections in the cross-section changing portion, a perimeter of one cross-section is 1.25 times or less a perimeter of the other cross-section.

12 Claims, 38 Drawing Sheets

(51) Int. Cl.
   *B21D 53/88* (2006.01)
   *B62D 25/08* (2006.01)
   *B62D 29/00* (2006.01)
   *B62D 25/14* (2006.01)
   *F16L 9/00* (2006.01)

(52) U.S. Cl.
   CPC ............ *B62D 29/007* (2013.01); *B62D 25/14* (2013.01); *F16L 9/003* (2013.01)

(56) References Cited

U.S. PATENT DOCUMENTS

| | | | | |
|---|---|---|---|---|
| 6,247,344 | B1 * | 6/2001 | Eipper | B21D 47/01 72/62 |
| 6,739,166 | B1 * | 5/2004 | Shah | B21D 26/033 72/58 |
| 6,971,691 | B1 | 12/2005 | Heatherington et al. | |
| RE40,736 | E | 6/2009 | Heatherington et al. | |
| 7,543,883 | B2 * | 6/2009 | Chen | B62D 25/06 296/203.03 |
| 8,171,769 | B2 * | 5/2012 | Barthelemy | B21D 26/033 72/58 |
| 11,642,712 | B1 * | 5/2023 | Sachdev | B23P 15/00 72/254 |
| 2005/0285417 | A1 * | 12/2005 | Heatherington | B60R 19/18 293/102 |
| 2010/0218375 | A1 * | 9/2010 | Saito | B21D 53/88 29/897.2 |
| 2013/0020834 | A1 * | 1/2013 | Diersmann | B62D 25/04 72/364 |
| 2017/0122466 | A1 * | 5/2017 | Sakakibara | F24F 13/0263 |
| 2017/0266710 | A1 * | 9/2017 | Ishizuka | B21D 26/047 |
| 2018/0162456 | A1 * | 6/2018 | Faruque | B62D 21/04 |
| 2022/0081033 | A1 * | 3/2022 | Higai | B62D 25/08 |

OTHER PUBLICATIONS

International Search Report issued in Applicatio No. PCT/JP2020/045851, mailed Jan. 26, 2021.

* cited by examiner

FIG. 17
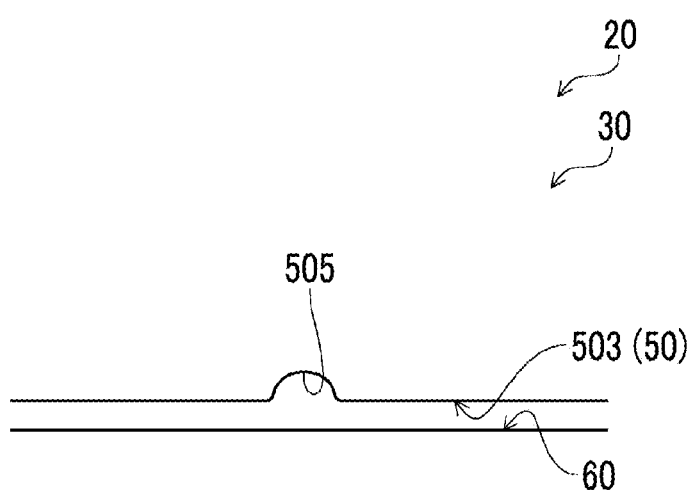
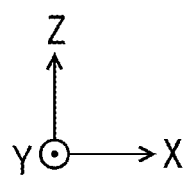

FIG. 30
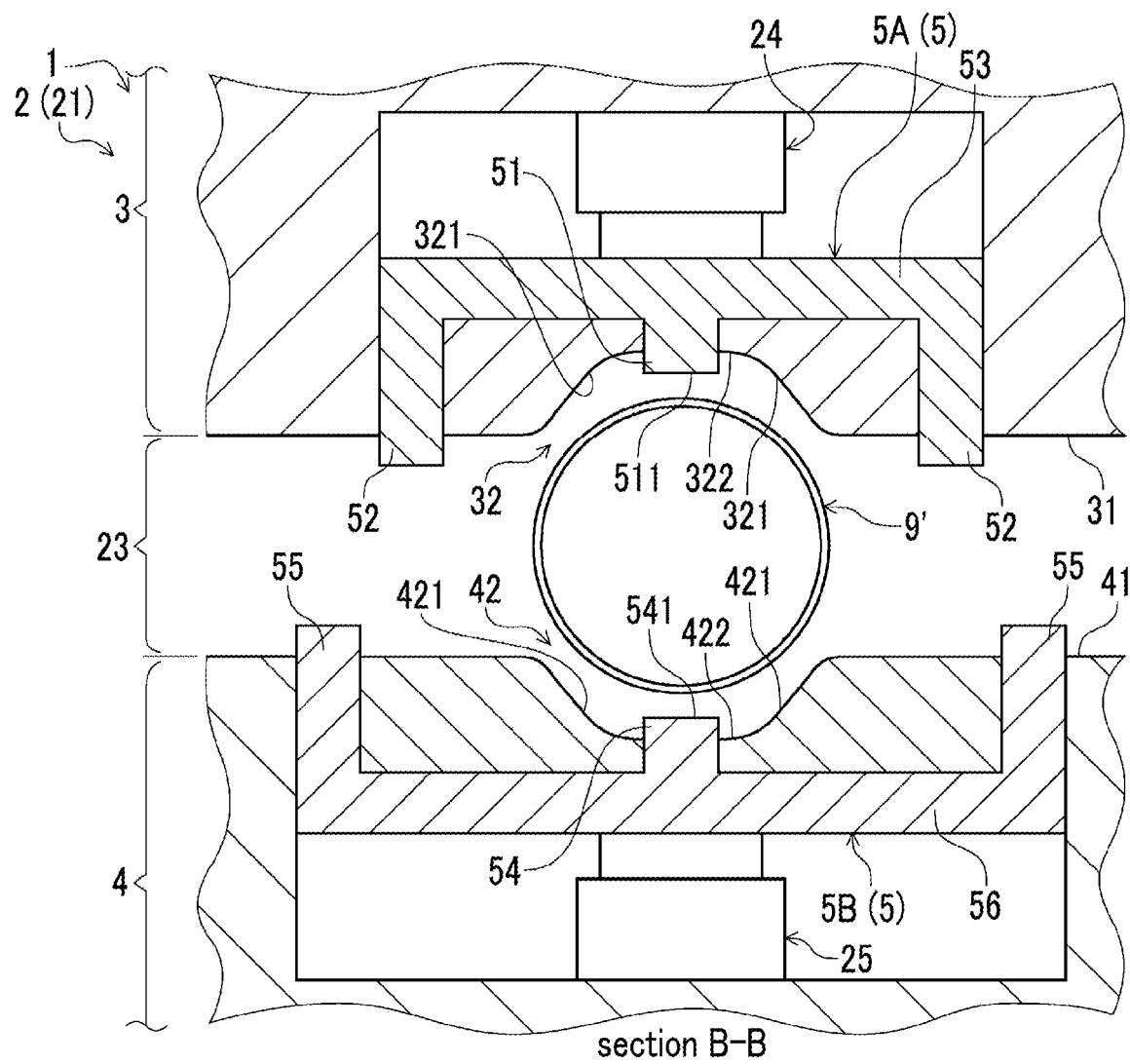
section B-B
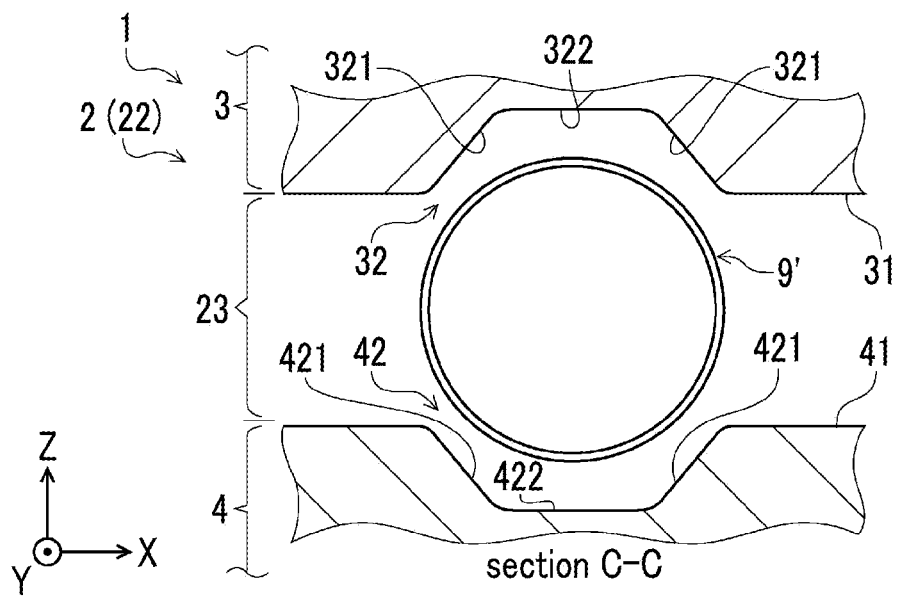
section C-C

FIG. 31
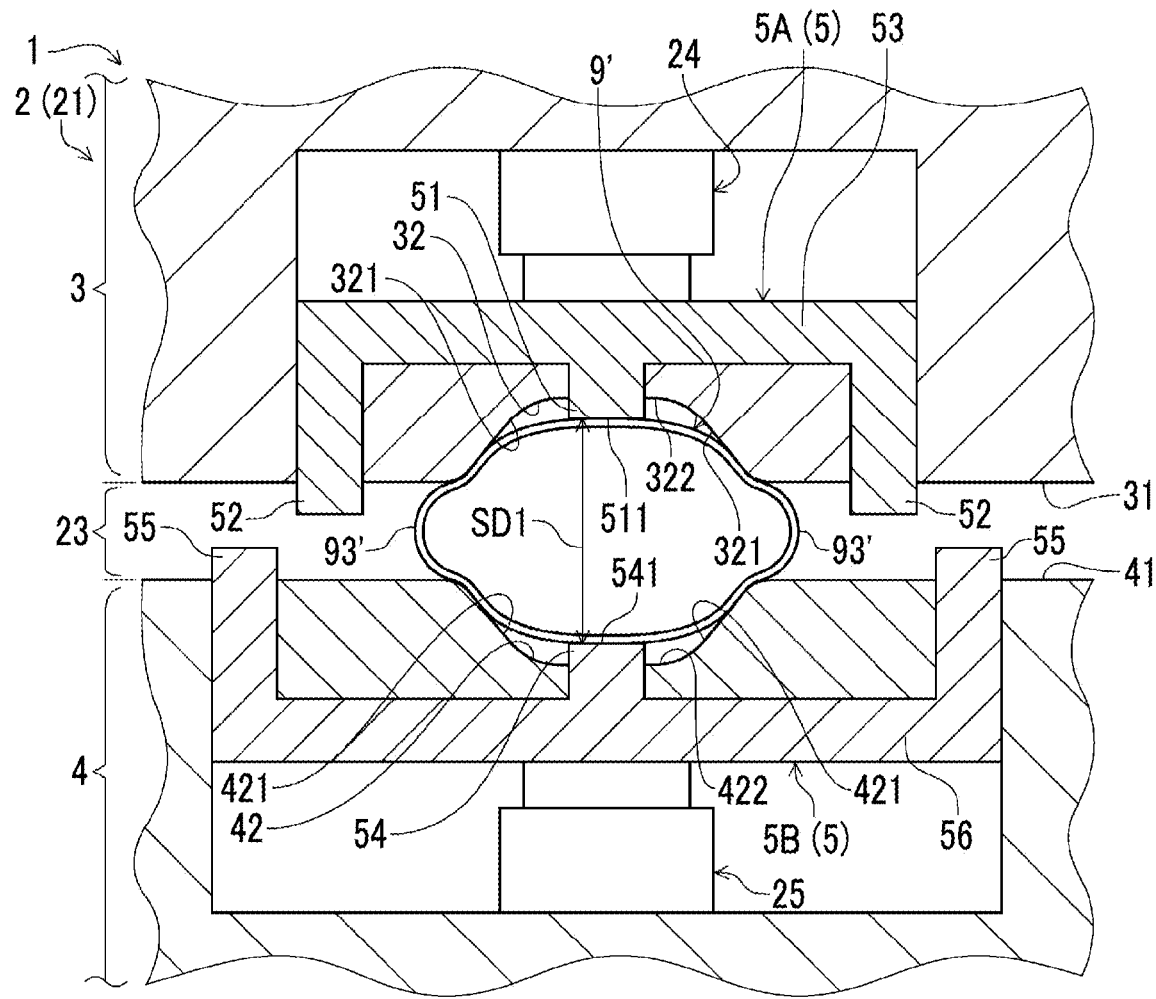
section B-B
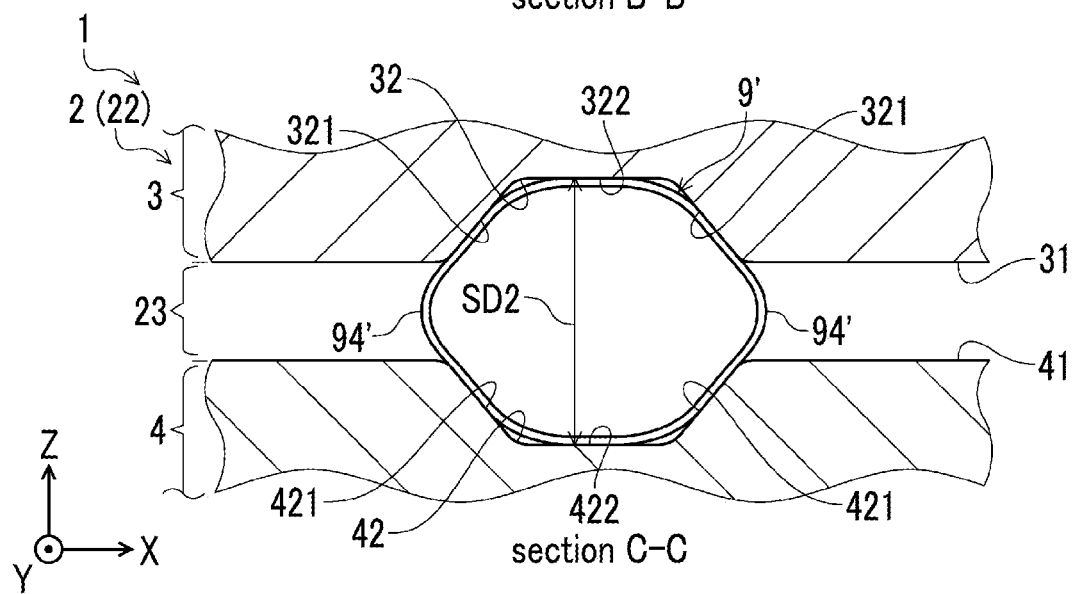
section C-C

FIG. 32
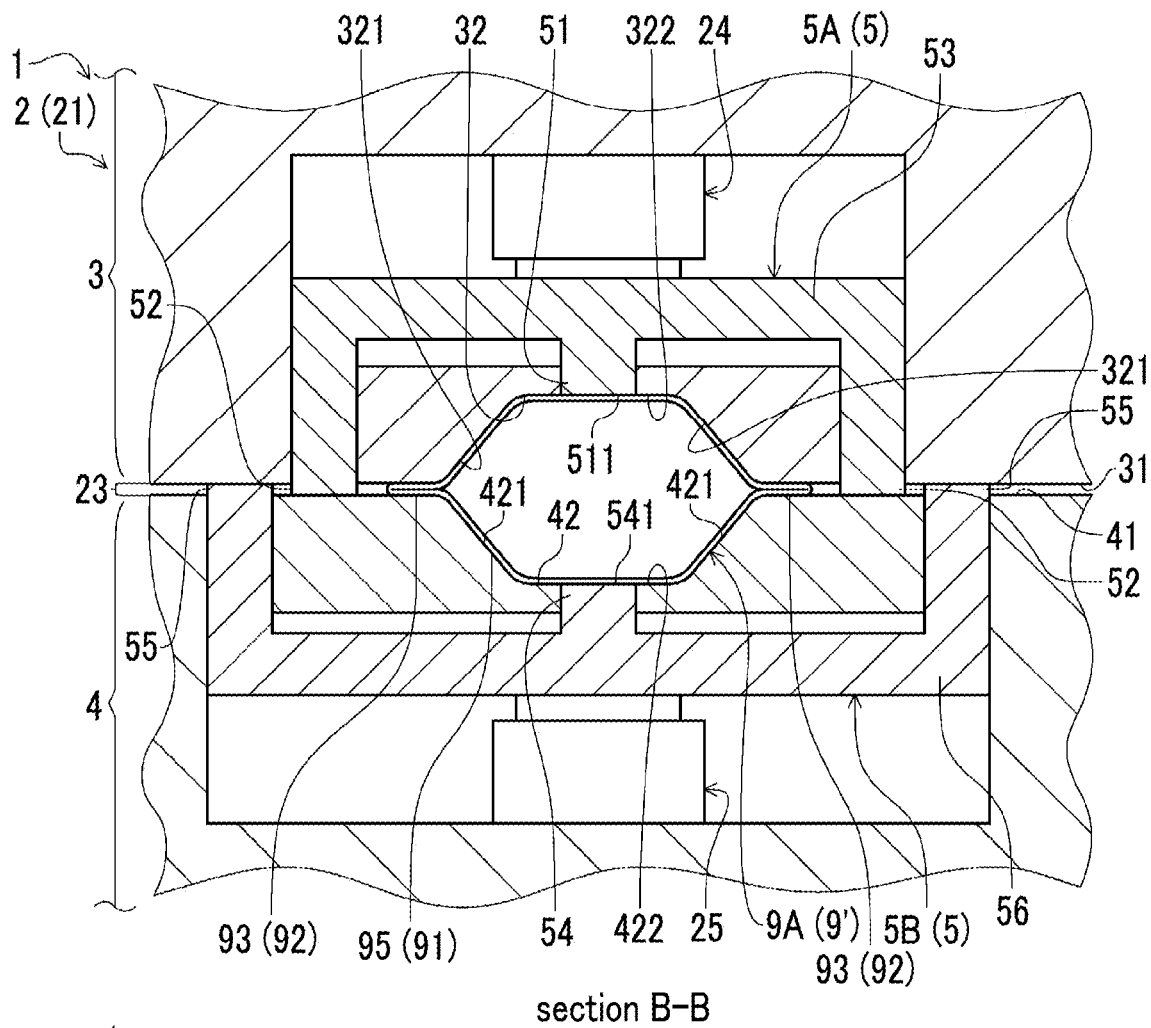
section B-B
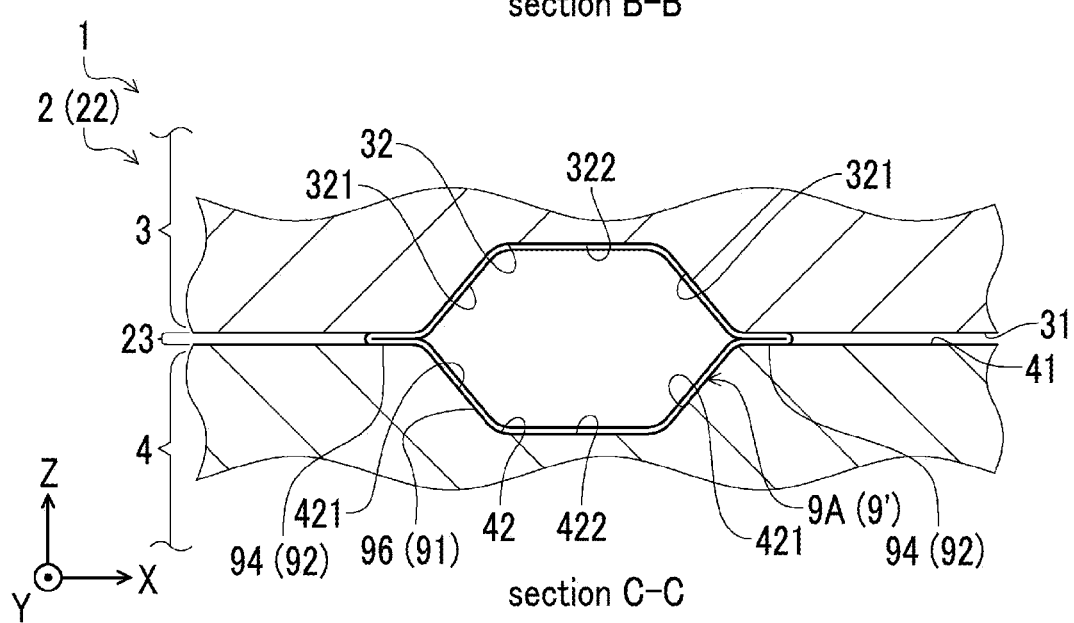
section C-C

FIG. 34
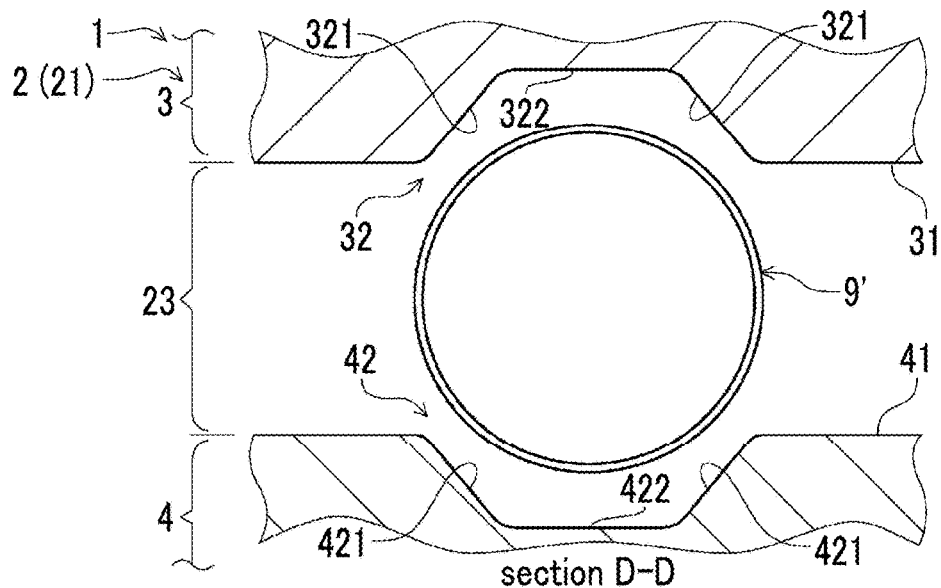
section D-D
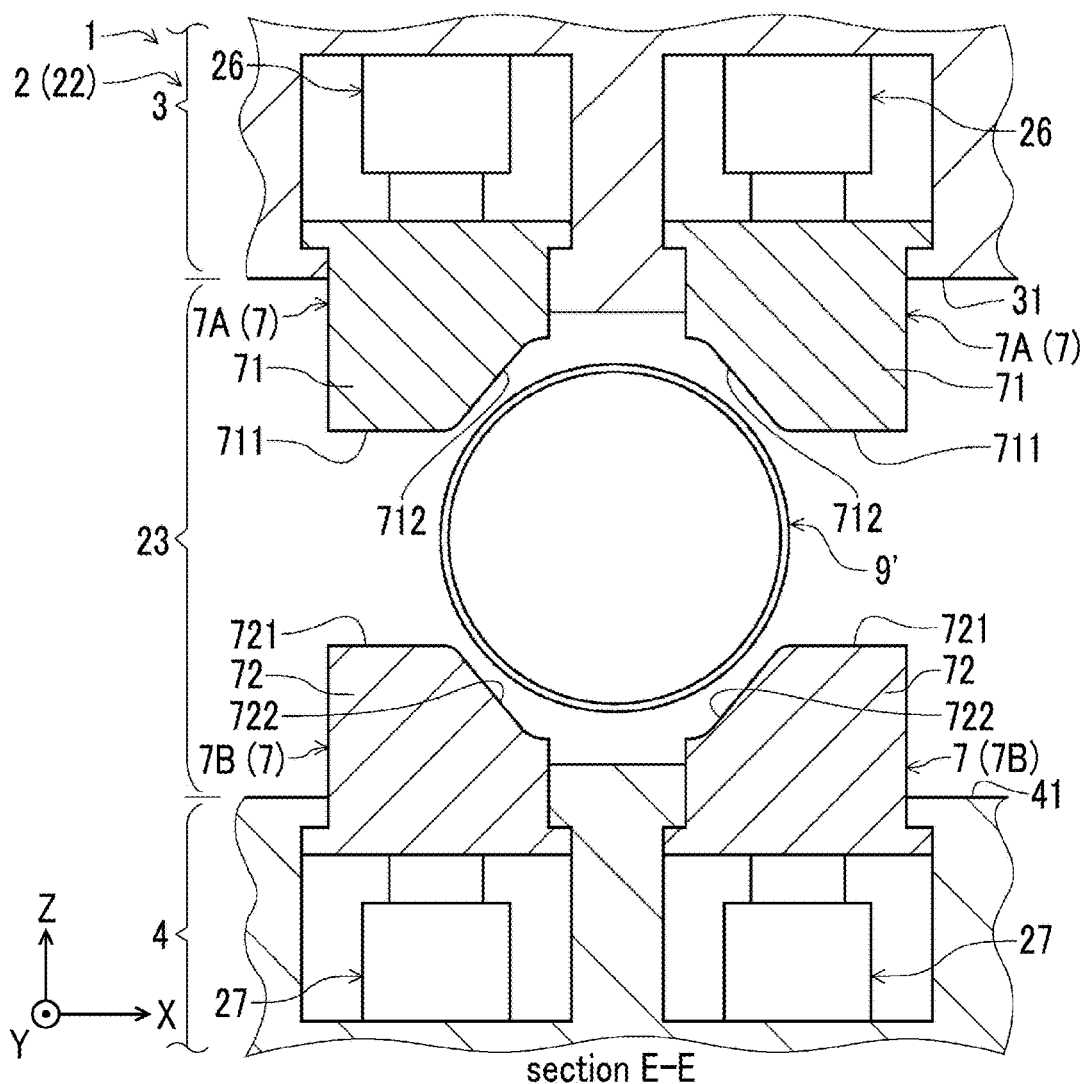
section E-E

FIG. 35
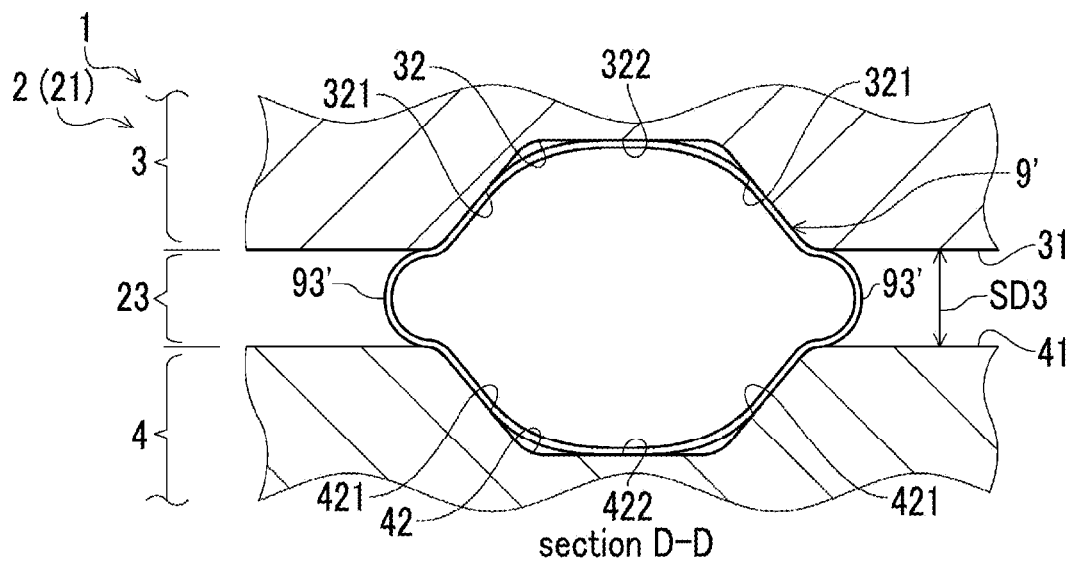
section D-D
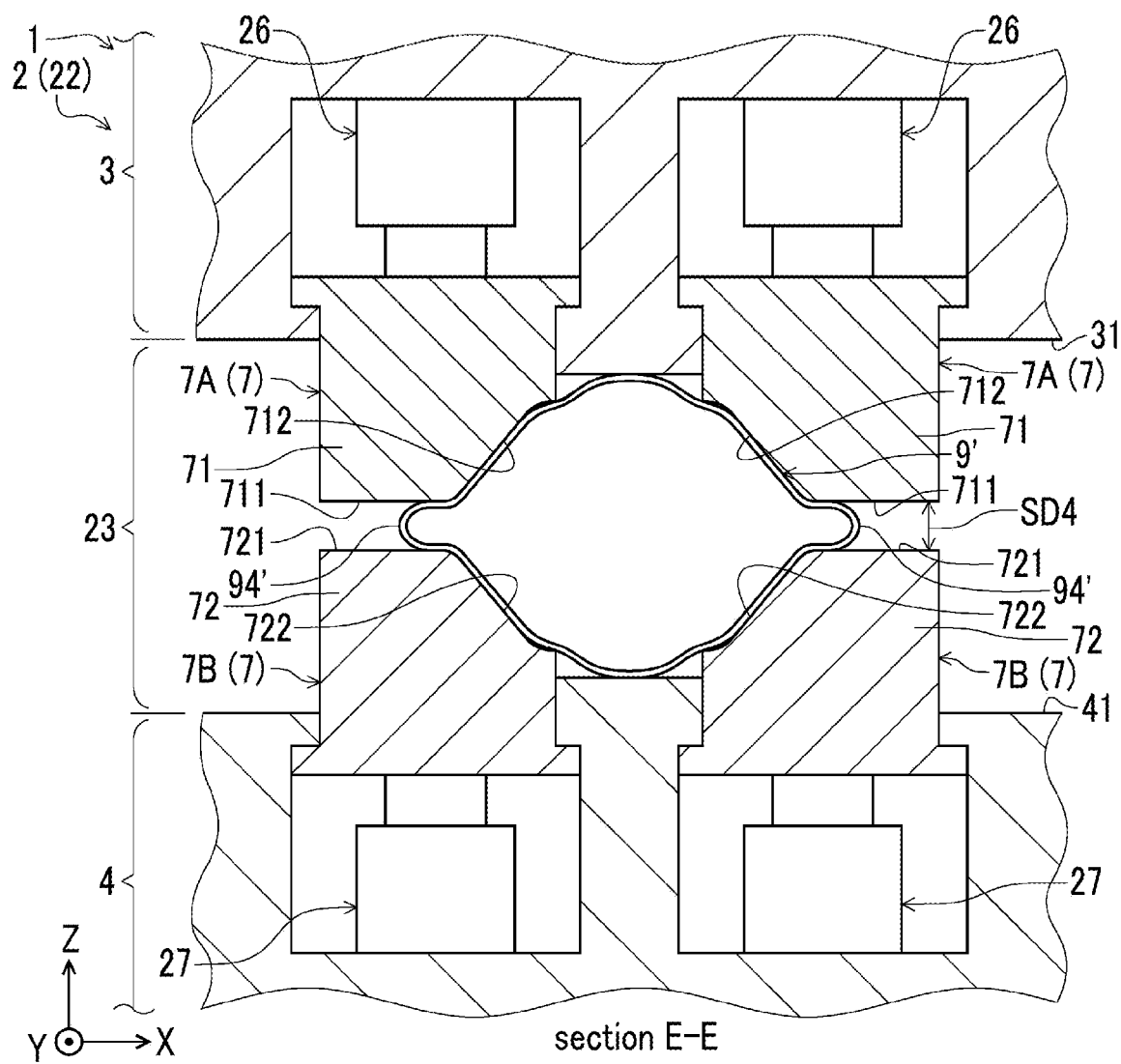
section E-E

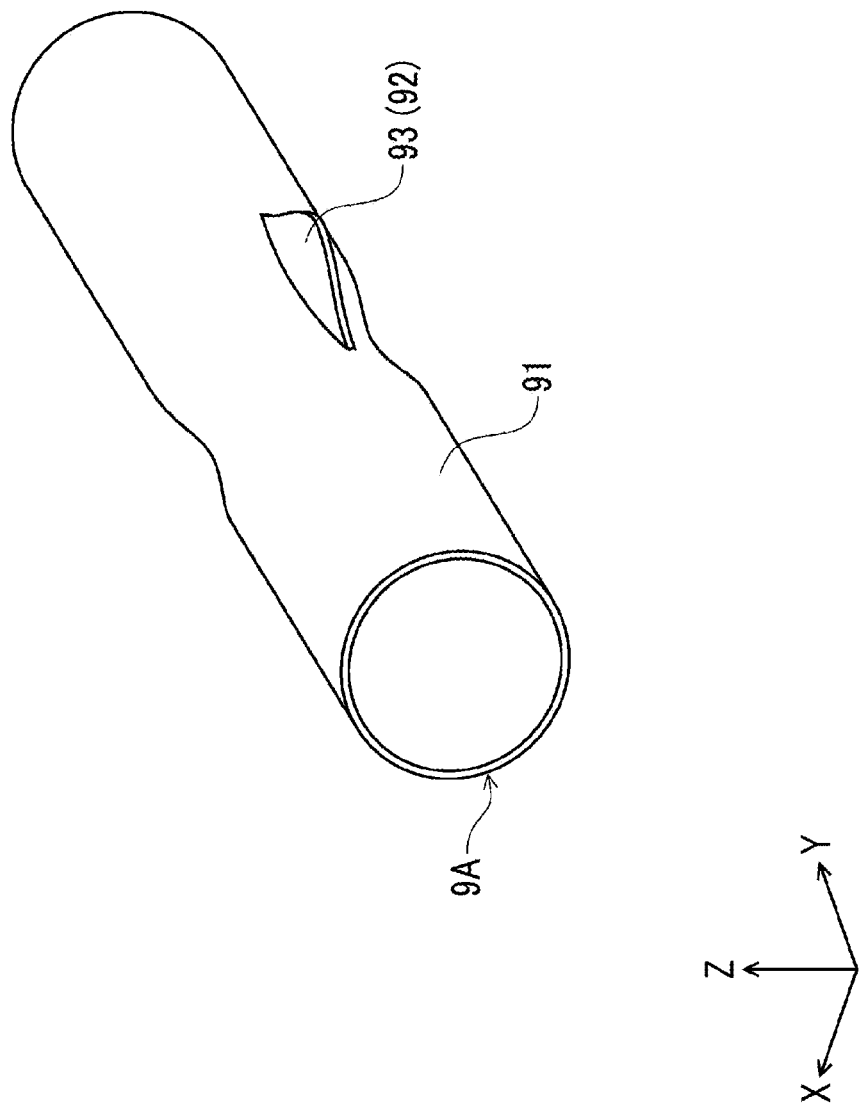

FLANGED MEMBER

RELATED APPLICATIONS

The contents of Japanese Patent Application No. 2020-006717, and of International Patent Application No. PCT/JP2020/045851, on the basis of each of which priority benefits are claimed in an accompanying application data sheet, are in their entirety incorporated herein by reference.

BACKGROUND

Technical Field

Certain embodiments of the present invention relate to a flanged member.

Description of Related Art

As a frame configuring the structure of an automobile, a steering member is known (for example, see the related art). The steering member described in the related art basically has a cylindrical shape as a whole. The steering member is provided with, for example, a steering support that supports a steering column, a bracket that is coupled to a dash panel, and an instrument stay coupled to the floor.

SUMMARY

According to an embodiment of the present invention, there is provided a flanged member that has a tubular shape and includes a flange portion, the flanged member including: a cross-section changing portion of which a cross-sectional shape changes along an axial direction of the flanged member, in which in any two cross-sections in the cross-section changing portion, a perimeter of one cross-section is 1.25 times or less a perimeter of the other cross-section.

BRIEF DESCRIPTION OF THE DRAWINGS

FIG. 17 is a vertical cross-sectional view showing a forming device (second embodiment).

FIG. 30 is a vertical cross-sectional view (a cross-sectional view taken along line B-B and a cross-sectional view taken along line C-C in FIG. 28) showing an operating state (mold open state) of the forming device shown in FIG. 28 in turn.

FIG. 31 is a vertical cross-sectional view (the cross-sectional view taken along line B-B and the cross-sectional view taken along line C-C in FIG. 28) showing an operating state (intermediate state) of the forming device shown in FIG. 28 in turn.

FIG. 32 is a vertical cross-sectional view (the cross-sectional view taken along line B-B and the cross-sectional view taken along line C-C in FIG. 28) showing an operating state (mold clamping state) of the forming device shown in FIG. 28 in turn.

FIG. 34 is a vertical cross-sectional view (a cross-sectional view taken along line D-D and a cross-sectional view taken along line E-E in FIG. 33) showing an operating state (mold open state) of the forming device shown in FIG. 33 in turn.

FIG. 35 is a vertical cross-sectional view (the cross-sectional view taken along line D-D and the cross-sectional view taken along line E-E in FIG. 33) showing an operating state (intermediate state) of the forming device shown in FIG. 33 in turn.

FIG. 41 is a perspective view showing an operating state (after forming the flange portion) of the forming device (seventh embodiment).

DETAILED DESCRIPTION

When the steering member described in the related art is provided with the steering support, the bracket, and the instrument stay, it is assumed that the members are joined to each other using arc welding. However, in general, the arc welding has a problem in which joining workability tends to decrease, such as costs are high when joining the members to each other or a jig that positions the members is required.

It is desirable to provide a flanged member that is excellent in joining workability, for example, when manufacturing an automobile and can be used in an automotive member also excellent in durability.

With the present invention, in any two cross-sections in the cross-section changing portion, the perimeter of the one cross-section is kept within 1.25 times or less the perimeter of the other cross-section. By satisfying such a numerical range, the flanged member is prevented from forming a thin wall portion. Accordingly, for example, in a case where the flanged member is used as the automotive member, the automotive member is a member excellent in durability to a degree that can sufficiently withstand regardless of the use environment of the automobile on which the automotive member is to be mounted.

In addition, another automotive member can be easily joined to a flange portion. For example, spot welding can be used for the joining. The spot welding can generally better reduce costs of joining the members to each other than the arc welding. In addition, a jig that positions the members is usually used in the arc welding, but the use of the jig can be omitted in the spot welding. The automotive member that can use the spot welding as described above is a member excellent in joining workability between the automotive member and another member.

Hereinafter, a flanged member of the present invention will be described in detail based on suitable embodiments shown in the accompanying drawings.

First Embodiment of Automotive Member

A first embodiment of the flanged member of the present invention will be described with reference to FIGS. 1 to 8. Hereinafter, for convenience of description, the left in FIGS. 1 to 3 will be called "left (or leftward)", and the right will be called "right (rightward)". In addition, an upper side in FIG. 1 and FIGS. 4 to 8 will be called "up (or upward)", and a lower side will be called "down (or downward)".

Figure 1:
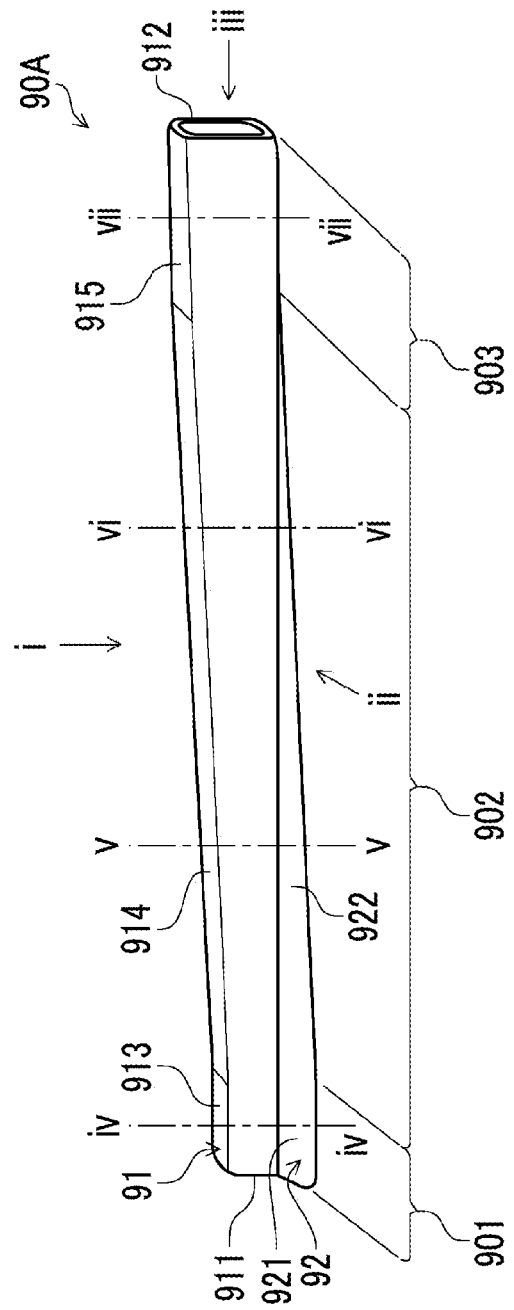
FIG. 1 is a perspective view showing a first embodiment of an automotive member.

An automotive member 90A shown in FIG. 1 is a component to which the flanged member of the present invention is applied. The automotive member 90A includes a pipe portion 91 and a flange portion 92. The automotive member 90A is configured by, for example, a metal material such as an iron-carbon alloy.

As will be described later, the automotive member 90A, that is, the flanged member of the present invention is obtained by hot blow forming a tubular body, which is a base material 90', by a forming device 20 to be described later. Whether or not the automotive member 90A is obtained by hot blow forming the base material 90' (tubular body) is determined, for example, when internal composition of the automotive member 90A is checked with an electronic microscope. In this case, it can be learned that the automotive member 90A is a compression molding product, and is not, for example, an extruded molding product.

Figure 2:
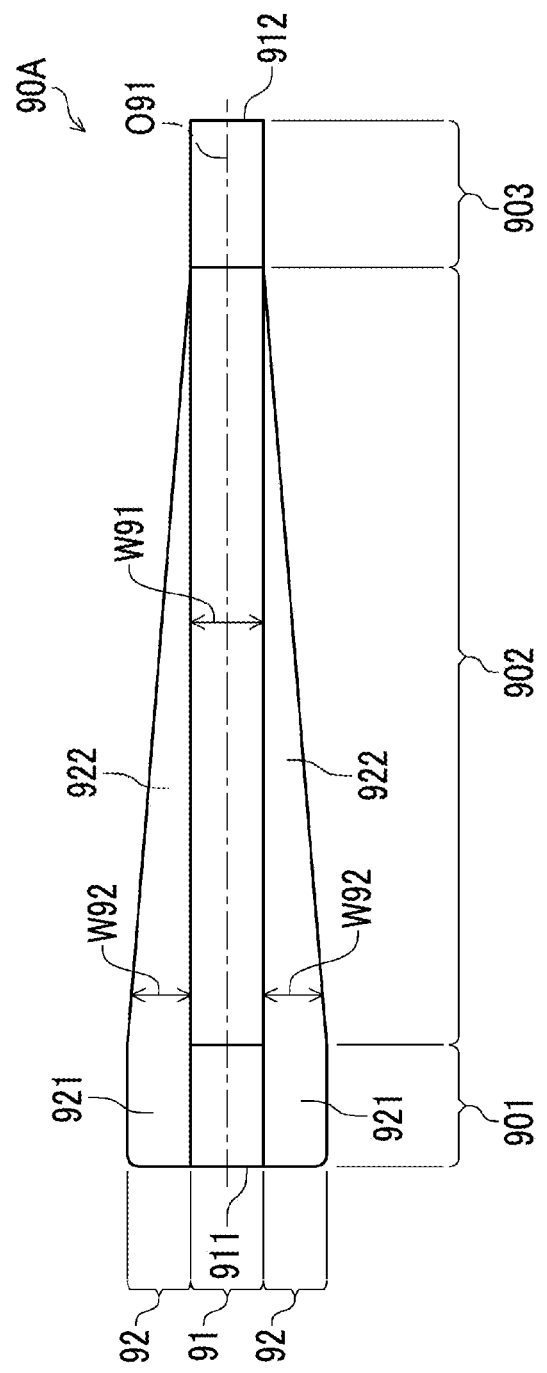
FIG. 2 is a view seen from an arrow i direction in FIG. 1.
Figure 3:
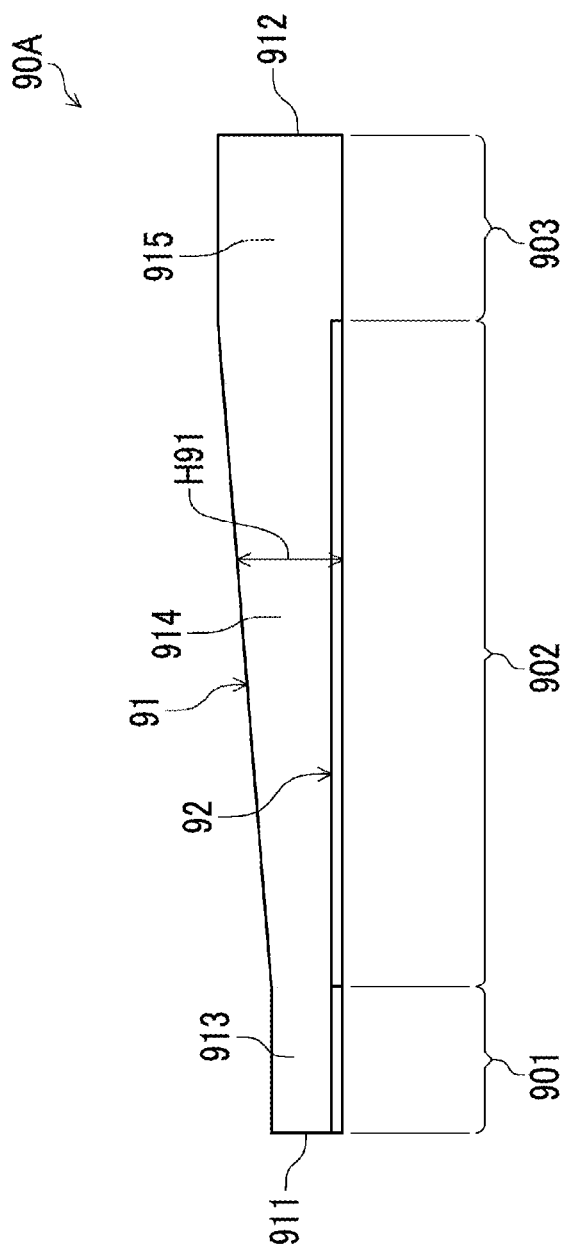
FIG. 3 is a view seen from an arrow ii direction in FIG. 1.

As shown in FIGS. 1 to 3, the pipe portion 91 is a portion that has a tubular shape and extends linearly from the left toward the right. A cross-sectional shape of the pipe portion 91 is not particularly limited, but has, for example, a quadrangular (rectangular) shape with rounded corner portions in the present embodiment as shown in FIGS. 5 to 8. Therefore, the pipe portion 91 can also be called a "rectangular portion" in the present embodiment.

Figure 16:
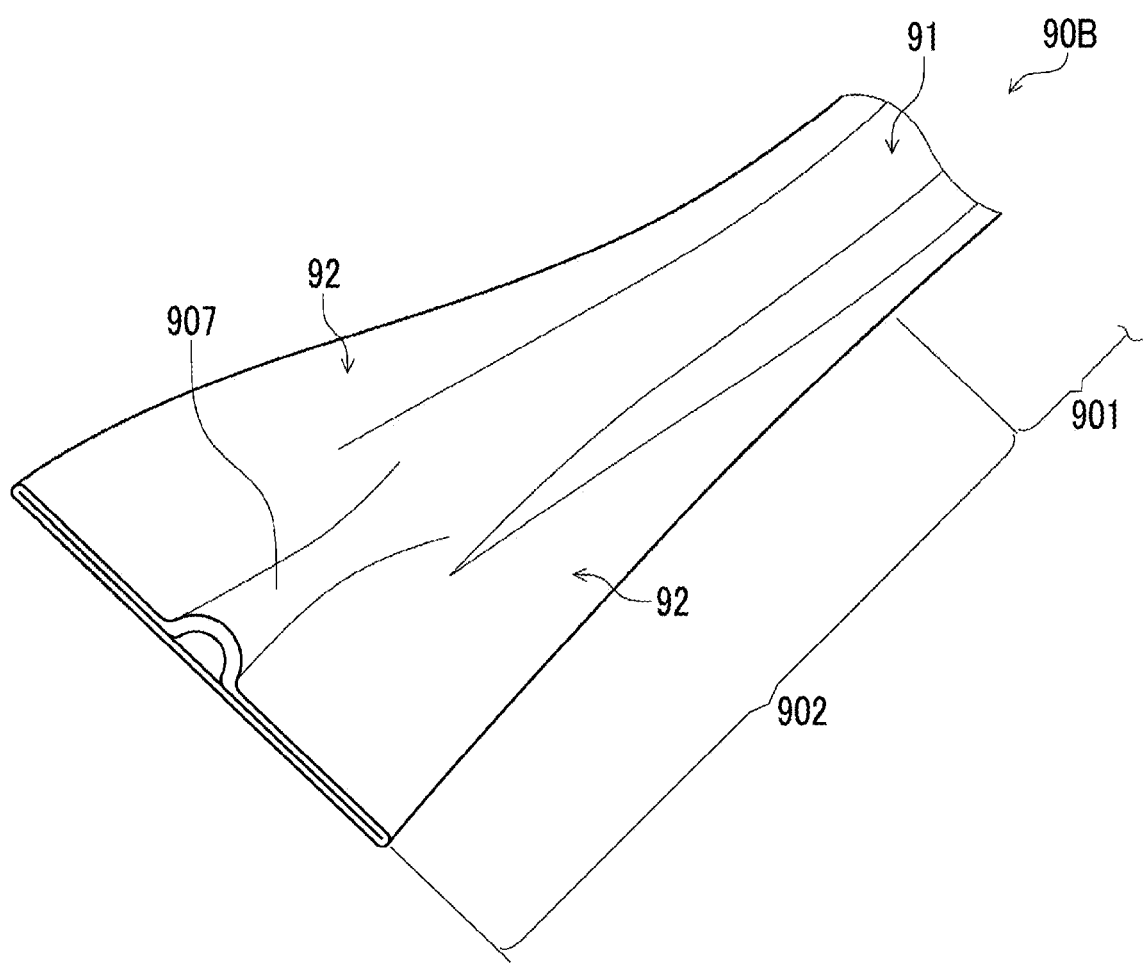
FIG. 16 is a perspective view showing a second embodiment of the automotive member.

In the present specification, "tubular" includes a state where a space is not interrupted from the pipe portion 91 toward a tunnel portion 907 as shown in FIG. 16 as being tubular.

Figure 4:
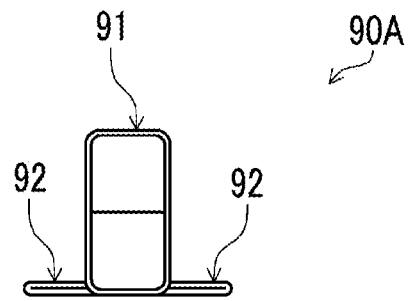
FIG. 4 is a view seen from an arrow iii direction in FIG. 1.

As shown in FIG. 4, at a lower portion of an outer peripheral portion of the pipe portion 91, the flange portions 92 protrude in a plate shape and are formed integrally with each other. The flange portions 92 are formed on both sides of a width direction of the pipe portion 91, respectively. Each of the flange portions 92 protrudes in an opposite direction to each other.

As shown in FIG. 2, each of the flange portions 92 is formed along a center axis (axis) O91 direction of the pipe portion 91 (base material 90'). In the present embodiment, each of the flange portions 92 is formed from a left end 911 of the pipe portion 91 to the middle of a center axis O91 of the pipe portion 91, and each of the flange portions 92 is not formed from the middle to a right end 912 of the pipe portion 91.

In addition, each of the flange portions 92 includes a constant width portion 921 of which a width (protruding amount) W92 is constant along the center axis O91 direction and a changing width portion (gradually decreasing width portion) 922 of which the width (protruding amount) W92 changes along the center axis O91 direction, that is, has gradually decreased from a constant width portion 921 side toward a right end 912 side.

On the other hand, also the pipe portion 91 includes a constant height portion 913 of which a height H91 is constant along the center axis O91 direction, a changing height portion (gradually increasing height portion) 914 of which the height H91 changes along the center axis O91 direction, that is, has increased from a constant height portion 913 side toward the right end 912 side, and a constant height portion 915 of which the height H91 is a constant height along the center axis O91 direction. The constant height portion 915 is higher than the constant height portion 913. Then, the constant width portion 921 of the flange portion 92 is formed at the constant height portion 913, and the changing width portion 922 of the flange portion 92 is formed at the changing height portion 914. A width W91 of the pipe portion 91 is constant along the center axis O91 direction over the entire length. Accordingly, each of the constant height portion 913, the changing height portion 914, and the constant height portion 915 has the same width W91.

Therefore, the automotive member 90A has three portions corresponding to a cross-sectional shape, that is, a constant cross-section portion 901, a cross-section changing portion 902, and a constant cross-section portion 903 (see FIG. 1 and FIGS. 5 to 8).

Figure 5:
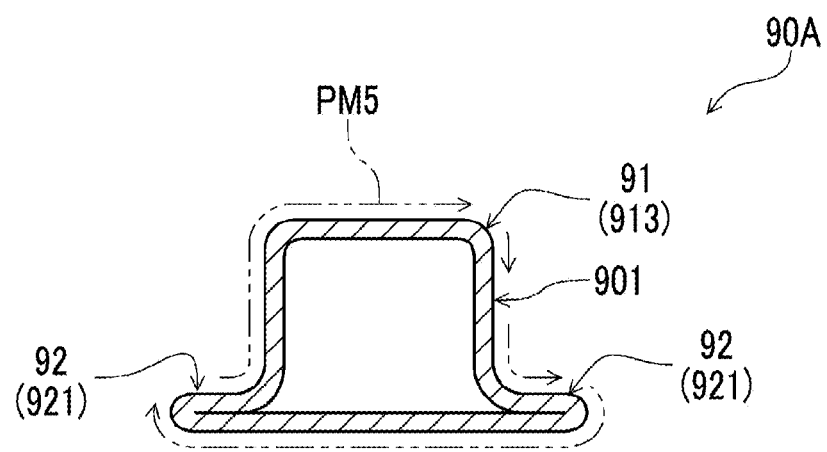
FIG. 5 is a cross-sectional view taken along line iv-iv in FIG. 1.

As shown in FIG. 5, the constant cross-section portion 901 includes the constant height portion 913 of the pipe portion 91 and the constant width portion 921 of the flange portion 92. As described above, the constant height portion 913 has the height H91 that is constant along the center axis O91 direction, and the constant width portion 921 also has the width W92 that is constant along the center axis O91 direction. Accordingly, a cross-sectional shape of the constant cross-section portion 901 is constant along the center axis O91 direction.

Figure 8:
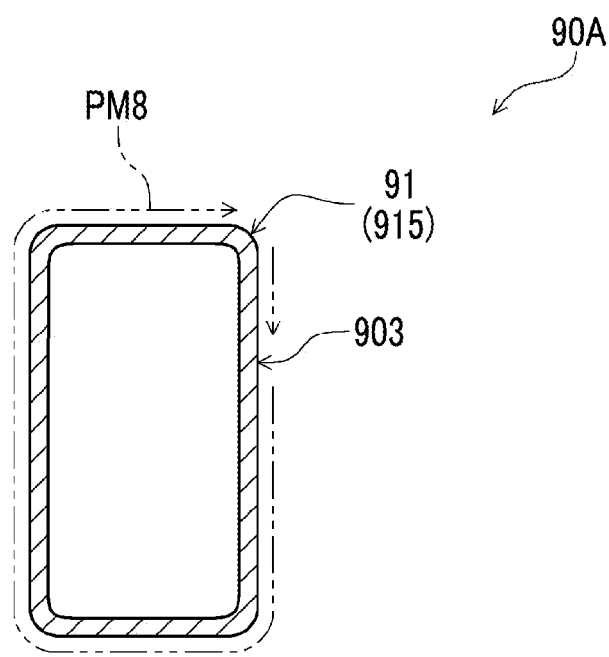
FIG. 8 is a cross-sectional view taken along line vii-vii in FIG. 1.

As shown in FIG. 8, the constant cross-section portion 903 includes the constant height portion 915 of the pipe portion 91. As described above, the constant height portion 915 has the height H91 that is constant along the center axis O91 direction. Accordingly, a cross-sectional shape of the constant cross-section portion 903 is constant along the center axis O91 direction.

Figure 6:
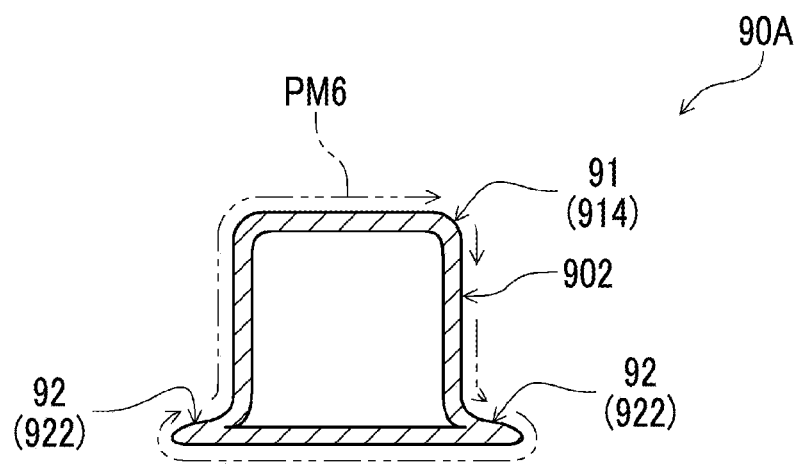
FIG. 6 is a cross-sectional view taken along line v-v in FIG. 1.
Figure 7:
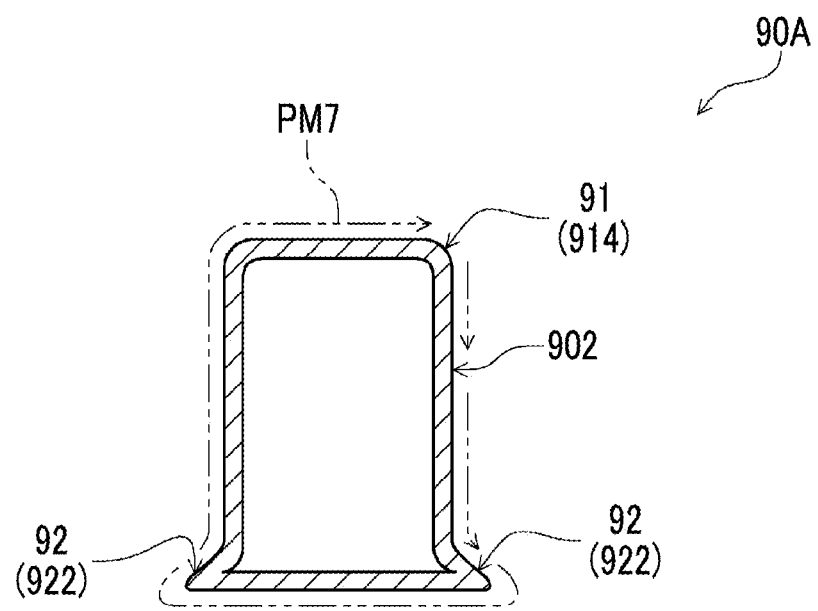
FIG. 7 is a cross-sectional view taken along line vi-vi in FIG. 1.

The cross-section changing portion 902 is positioned between the constant cross-section portion 901 and the constant cross-section portion 903. As shown in FIGS. 6 and 7, the cross-section changing portion 902 includes the changing height portion 914 of the pipe portion 91 and the changing width portion 922 of the flange portion 92. As described above, the changing height portion 914 has the height H91 that changes along the center axis O91 direction, and the changing width portion 922 also has the width W92 that changes along the center axis O91 direction. Accordingly, the cross-section changing portion 902 is a portion of which a cross-sectional shape changes continuously along the center axis O91 direction.

Then, when perimeters along outer peripheries of any two cross-sections (for example, a cross-section shown in FIG. 6 and a cross-section shown in FIG. 7) of the cross-section changing portion 902 are compared to each other, the following relationship is satisfied. The "perimeter" is the outermost perimeter in the cross-section. In addition, the perimeter of the cross-section shown in FIG. 6 is defined as PM6, and the perimeter of the cross-section shown in FIG. 7 is defined as PM7.

The perimeter PM6 ($\geq$PM7) is within a range of onetime or more and 1.25 times or less the perimeter PM7, and preferably within a range of one time or more and less than 1.1 times the perimeter PM7. Hereinafter, the numerical range will be called a "perimeter numerical range". In the automotive member 90A, as the height of the pipe portion 91 is increased or decreased according to the size of the width of the flange portion 92, the perimeter is kept within such a perimeter numerical range.

In a case where the perimeter exceeds an upper limit value of the perimeter numerical range, the cross-section changing portion 902 of the automotive member 90A comes into a state of excessively extended and deformed. As a result, a thin wall portion is generated at the cross-section changing portion 902, and the strength of the thin wall portion decreases. For example, since there is a possibility that the automotive member breaks depending on the use environment of an automobile, when such an automotive member 90A is mounted on the automobile, the automotive member cannot be used.

On the contrary, by satisfying the perimeter numerical range, the automotive member 90A is prevented from forming the thin wall portion. Accordingly, the automotive member 90A is a member excellent in durability to a degree that can sufficiently withstand regardless of the use environment of the automobile on which the automotive member is to be mounted.

In addition, for example, another automobile component having a plate shape is joined to the flange portion 92 of the automotive member 90A in some cases. The joining method is not particularly limited, but a method using welding can be used. In a case of this example, since the plate-shaped flange portion 92 and another plate-shaped automobile component are joined to each other, spot welding can be particularly used. The spot welding can generally better reduce joining costs than arc welding. In addition, a jig that positions members to be joined to each other is usually used in the arc welding, but the use of the jig can be omitted in the spot welding. The automotive member 90A that can use the spot welding as described above is a member excellent in joining workability to another automobile component.

First Embodiment of Forming Device

Hereinafter, a first embodiment of the forming device will be described with reference to FIGS. 9 to 15. Hereinafter, for convenience of description, three axes perpendicular to each other are defined as an X-axis, a Y-axis, and a Z-axis. For example, an XY-plane including the X-axis and the Y-axis is horizontal, and the Z-axis is vertical. In addition, a Z-axis direction positive side will be called "up (or upward)", and a Z-axis direction negative side will be called "down (or downward)" in some cases. In addition, an X-axis direction negative side will be called "left (or leftward)", and an X-axis direction positive side will be called "right (or rightward)" in some cases.

As shown in FIGS. 9 to 15, the forming device 20 includes a device main body 30 and a flange portion adjusting member 40. The forming device 20 can form the base material 90' at the automotive member 90A. In the forming device 20 shown in FIGS. 9 to 15, from the left in turn, portions ((A) of FIGS. 9 to 15) for forming the base material 90' into a iv-iv cross-section, portions ((B) of FIGS. 9 to 15) for forming the base material 90' into a v-v cross-section, portions ((C) of FIGS. 9 to 15) for forming the base material 90' into a vi-vi cross-section, and portions ((D) of FIGS. 9 to 15) for forming the base material 90' into a vii-vii cross-section are shown as representatives.

The device main body 30 includes a first mold 50 disposed on the upper side and a second mold 60 disposed on the lower side. The first mold 50 is supported movably in a Z-axis direction, and the second mold 60 is fixed. Accordingly, the first mold 50 can approach and separate with respect to the second mold 60.

The first mold 50 includes a first mold 50A shown in the portions ((A) of FIGS. 9 to 15, a first mold 50B shown in the portions ((B) of FIGS. 9 to 15, a first mold 50C shown in the portions ((C) of FIGS. 9 to 15, and a first mold 50D shown in the portions ((D) of FIGS. 9 to 15. Each of the first mold 50A to the first mold 50D is divided into a first member 501 positioned on the left, a second member 502 positioned on the right, and a third member 503 positioned between the first member 501 and the second member 502.

The third member 503 is supported independently and movably in the Z-axis direction with respect to the first member 501 and the second member 502. In addition, a recessed portion 504 responsible for forming the pipe portion 91 is formed in the third member 503. The recessed portion 504 of the third member 503 of the first mold 50A is the deepest, and the recessed portion 504 of the third member 503 of each of the first mold 50B to the first mold 50D has the same depth.

The second mold 60 is commonly used from the portions ((A) of FIGS. 9 to 15 to the portions ((D) of FIGS. 9 to 15.

The flange portion adjusting member 40 includes two flange portion adjusting members 40B shown in the portions ((B) of FIGS. 9 to 15, two flange portion adjusting members 40C shown in the portions ((C) of FIGS. 9 to 15, and two flange portion adjusting members 40D shown in the portions ((D) of FIGS. 9 to 15. Each of the flange portion adjusting members 40B is disposed between the first mold 50B and the second mold 60 and is supported movably in an X-axis direction. Each of the flange portion adjusting members 40C is disposed between the first mold 50C and the second mold 60 and is supported movably in the X-axis direction. Each of the flange portion adjusting members 40D is disposed between the first mold 50D and the second mold 60 and is supported movably in the X-axis direction.

In addition, the flange portion adjusting member 40B, the flange portion adjusting member 40C, and the flange portion adjusting member 40D have a block shape and have heights different from each other. In the forming device 20, the flange portion adjusting member 40B is the lowest, the flange portion adjusting member 40D is the highest, and the flange portion adjusting member 40C has an intermediate height between the flange portion adjusting member 40B and the flange portion adjusting member 40D.

The forming device 20 operates as follows.

Figure 9:
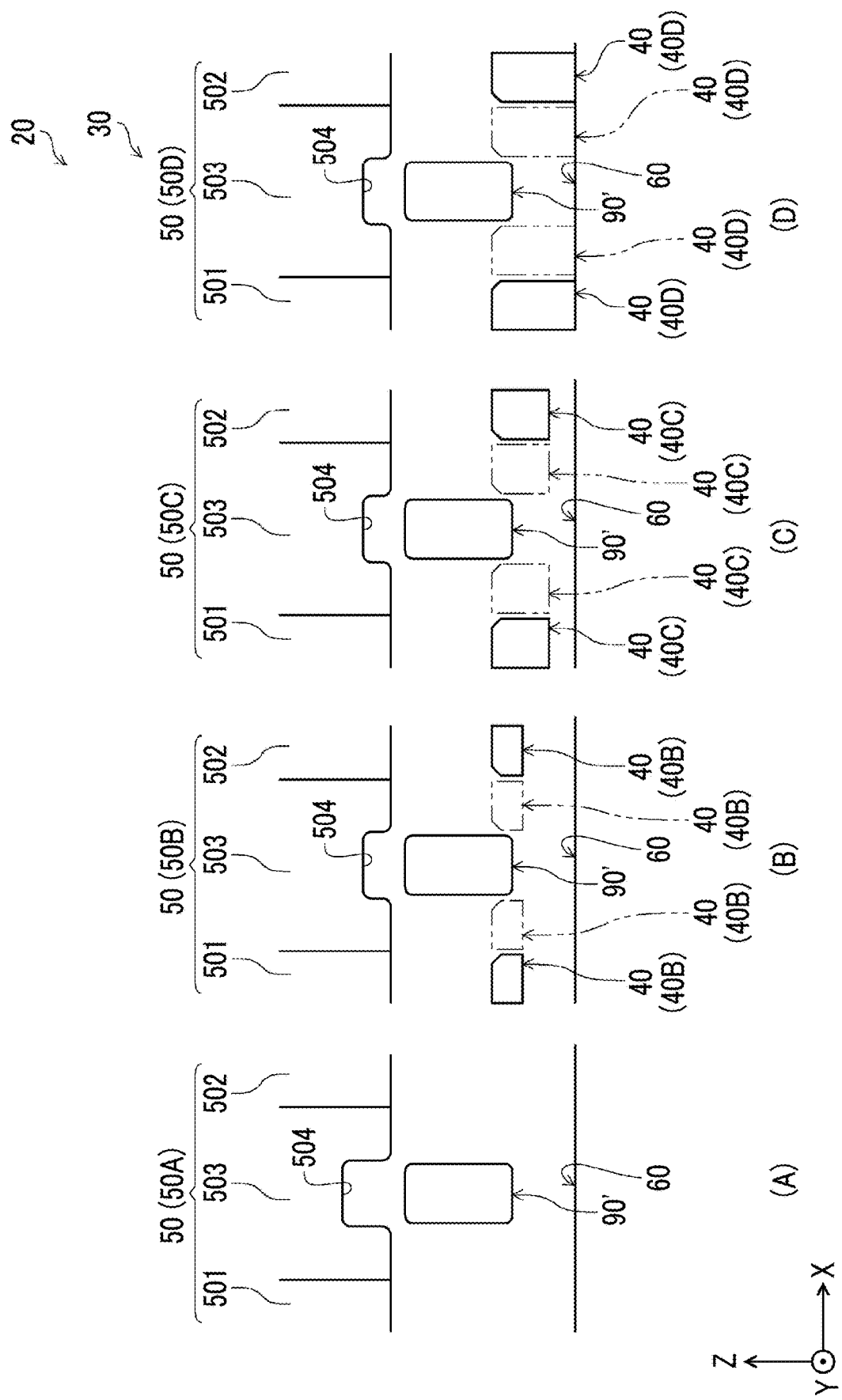
FIG. 9 is a vertical cross-sectional view showing operating states (mold open states) of a forming device (first embodiment) in turn.

First, as shown in FIG. 9, the base material 90' is disposed between the first mold 50 and the second mold 60 with the first mold 50 and the second mold 60 in a mold open state. The base material 90' is a tubular body of which a cross-sectional shape is almost a rectangular shape in the present embodiment.

Then, the base material 90' is heated and softened while maintaining the mold open state. In addition, in this case, each of the flange portion adjusting members 40 is most separated and retracted from the base material 90'. Accordingly, each of the flange portion adjusting members 40 can be prevented from being heated.

Figure 10:
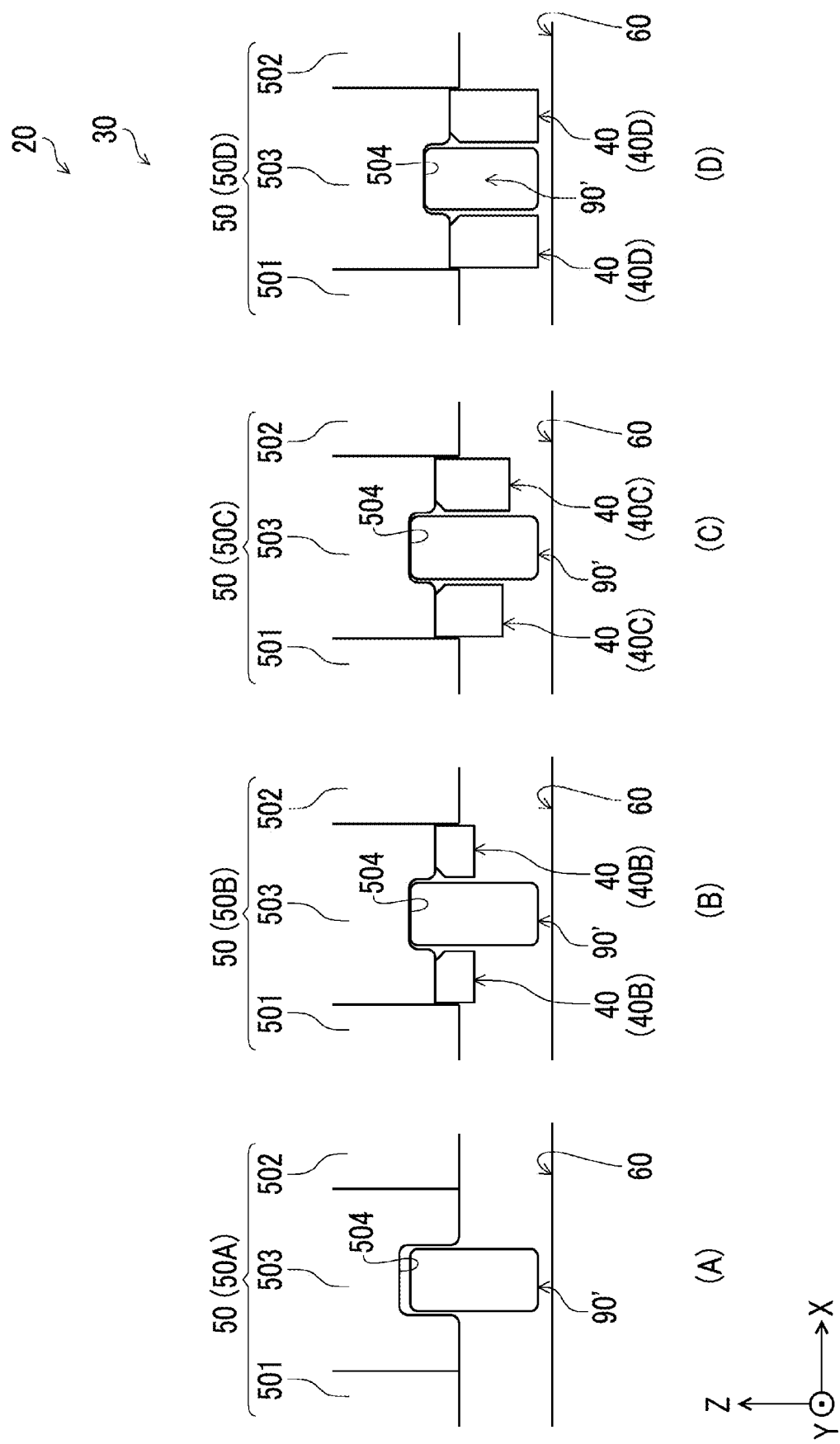
FIG. 10 is a vertical cross-sectional view showing operating states (first intermediate states) of the forming device (first embodiment) in turn.

Next, as shown in FIG. 10, the first mold 50 is lowered to bring each third member 503 and the base material 90' into contact with each other. In addition, in this case, an upper portion of the base material 90' enters the recessed portion 504 of each third member 503, and a distance to the second mold 60 is constant from the portions ((A) of FIG. 10 to the portions ((D) of FIG. 10.

In addition, each of the flange portion adjusting members 40 moves and comes into contact with the base material 90' and is pressed against the third member 503 from below by a spring mechanism (not shown). Accordingly, an upper portion of each of the flange portion adjusting members 40 enters between the first member 501 and the second member 502.

Figure 11:
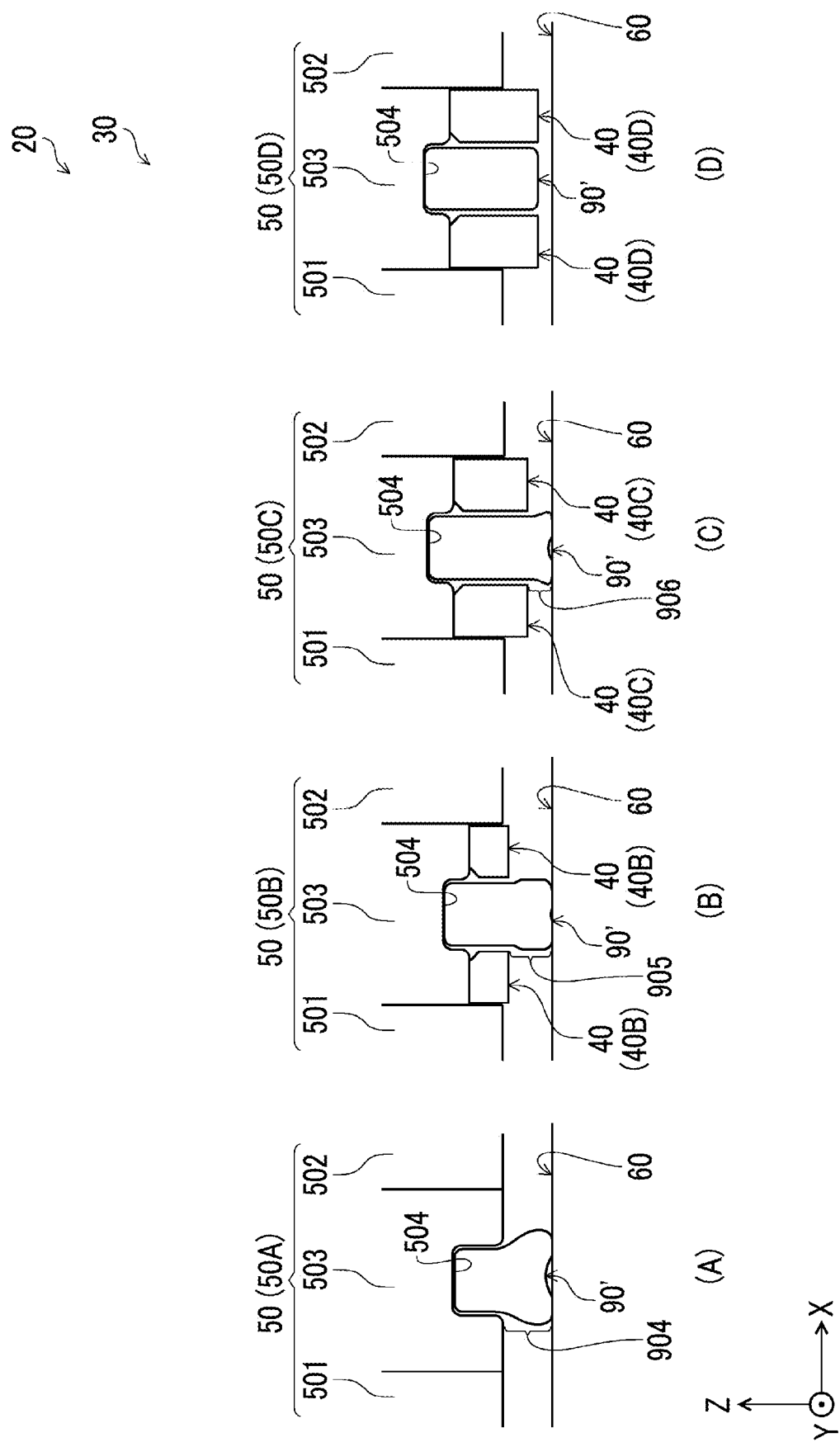
FIG. 11 is a vertical cross-sectional view showing operating states (second intermediate states) of the forming device (first embodiment) in turn.

Next, as shown in FIG. 11, when the first mold 50 is further lowered, the base material 90' comes into contact with the second mold 60 and starts to deform, that is, to crush. A deforming portion of the base material 90' is a protrusion portion 904 protruding (exposed) from the recessed portion 504 in the portion ((A) of FIG. 11, is a protrusion portion 905 protruding from between the flange portion adjusting members 40B in the portion ((B) of FIG. 11, and is a protrusion portion 906 protruding from between the flange portion adjusting members 40C in the portion ((C) of FIG. 11. The protrusion portion 904 has the largest protruding amount and is followed by the protrusion portion 905 and the protrusion portion 906 in this order. As shown in the portion ((D) of FIG. 11, since the base material 90' does not protrude from between the flange portion adjusting members 40D, there is no deformation.

Figure 12:
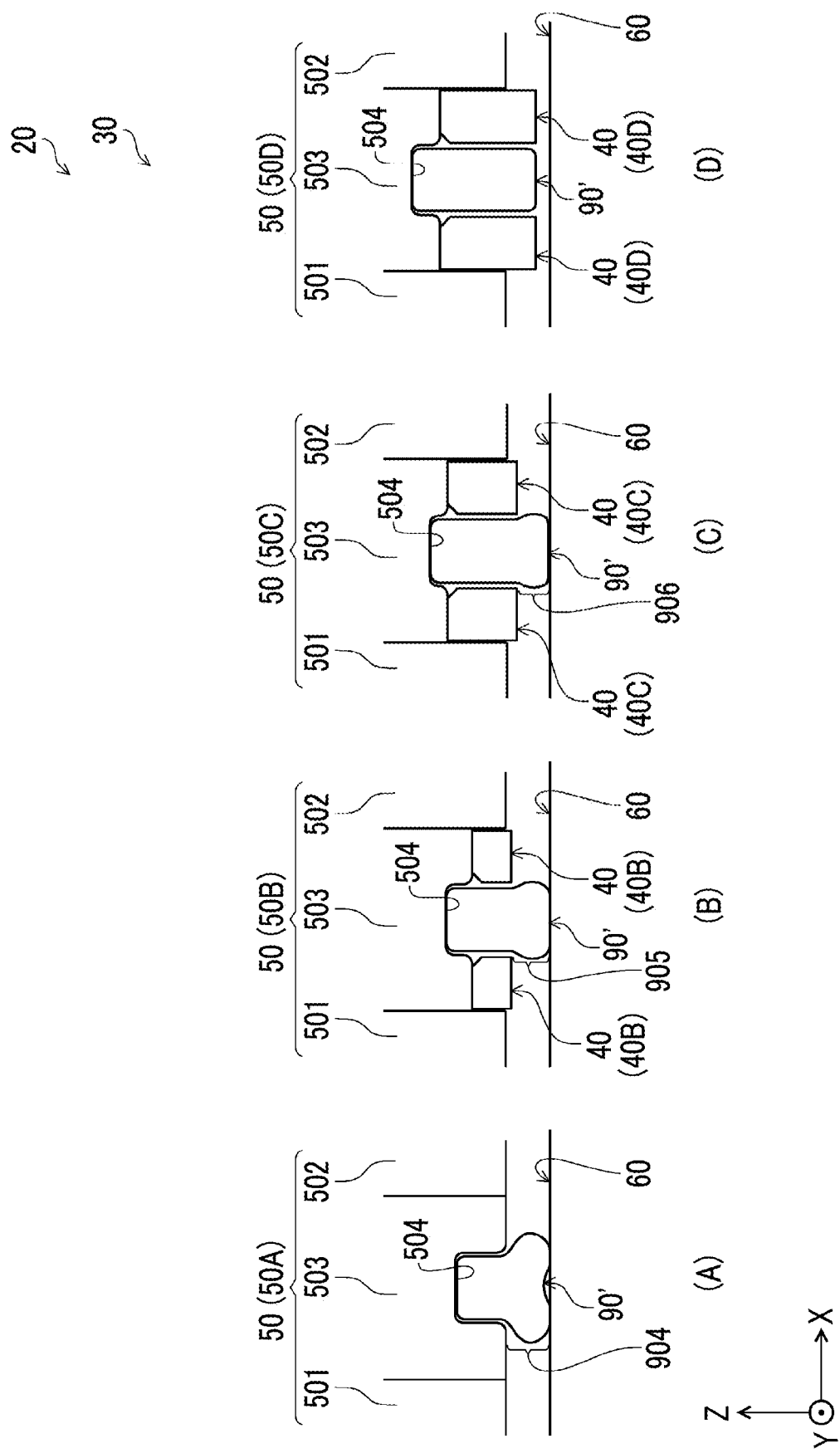
FIG. 12 is a vertical cross-sectional view showing operating states (third intermediate states) of the forming device (first embodiment) in turn.

Next, a gas is supplied into the base material 90' to start a primary blow. Accordingly, as shown in FIG. 12, all of the protrusion portion 904 to the protrusion portion 906 expand in the X-axis direction.

Figure 13:
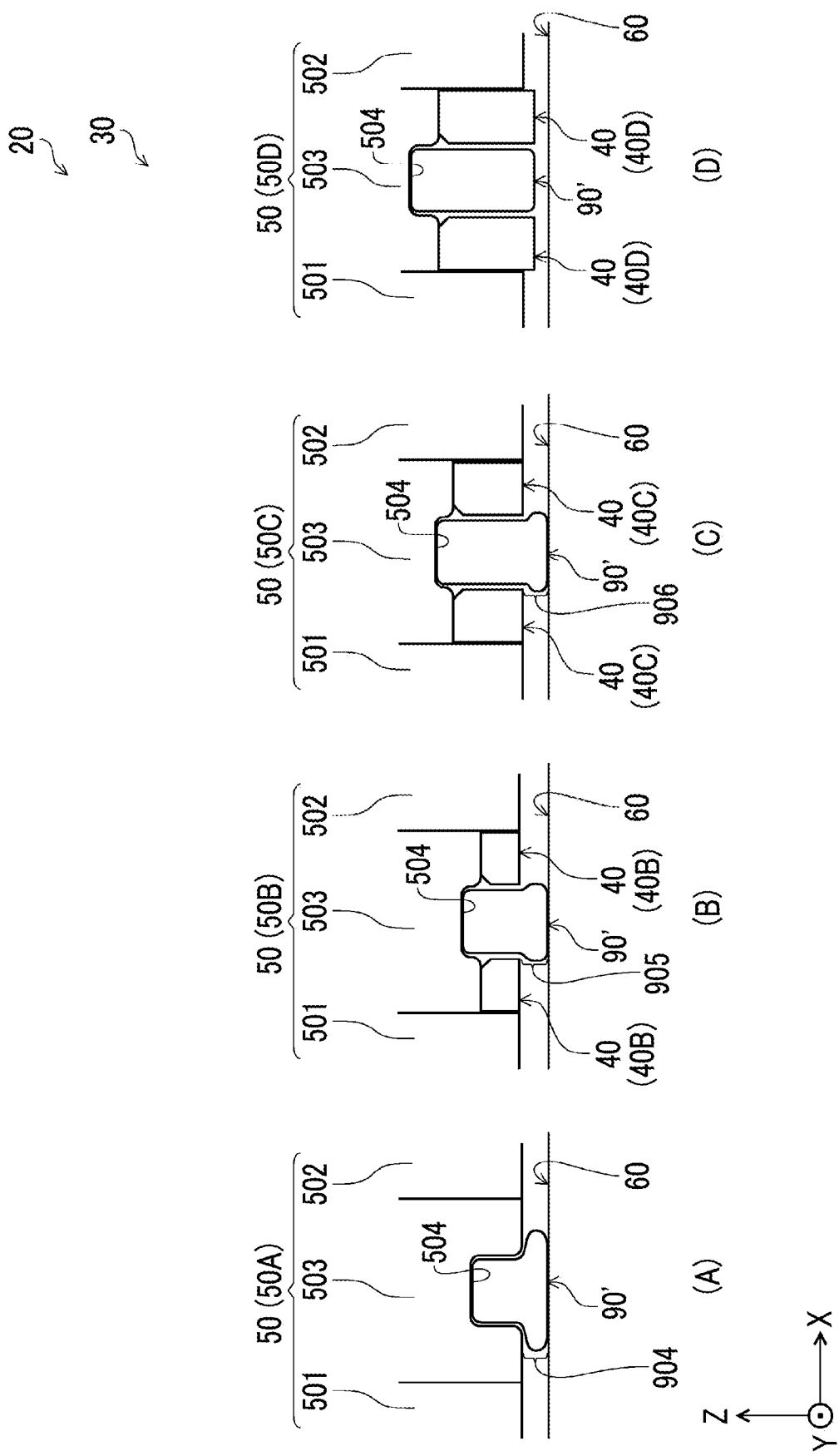
FIG. 13 is a vertical cross-sectional view showing operating states (fourth intermediate states) of the forming device (first embodiment) in turn.

Next, the first mold 50 is further lowered as shown in FIG. 13 while supplying a gas into the base material 90' for a predetermined time. In addition, the lowered amount of each third member in this case is not uniform and is adjusted as appropriate. After then, the supply of the gas into the base material 90' is temporarily stopped. Accordingly, all of the protrusion portion 904 to the protrusion portion 906 further expand in the X-axis direction. The protrusion portion 904 has the largest expanding amount in the X-axis direction and is followed by the protrusion portion 905 and the protrusion portion 906 in this order.

Figure 14:
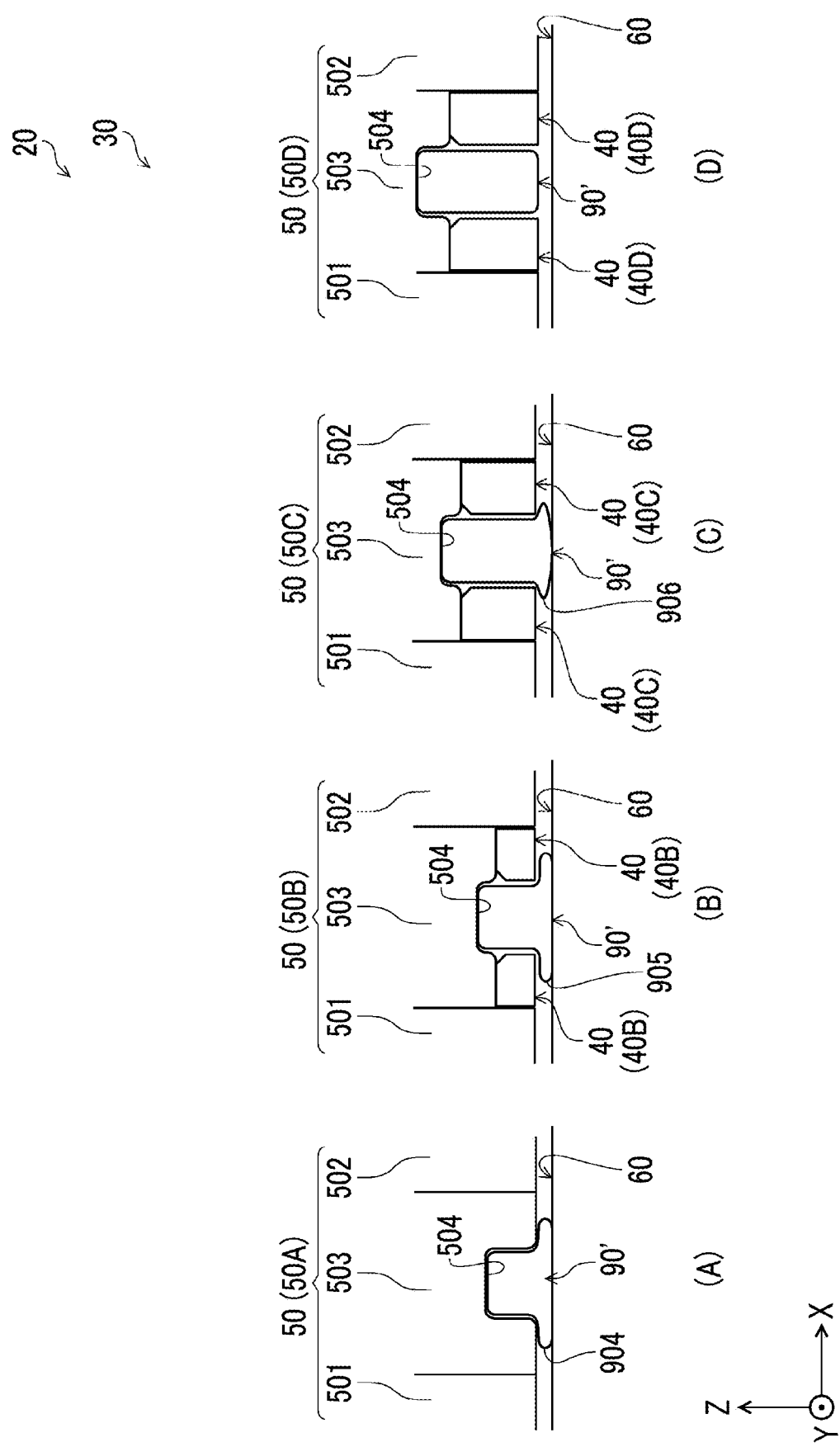
FIG. 14 is a vertical cross-sectional view showing operating states (fifth intermediate states) of the forming device (first embodiment) in turn.

Next, the first mold 50 is further lowered as shown in FIG. 14 while the supply of the gas into the base material 90' is stopped. Accordingly, the protrusion portion 904 crushes between the third member 503 and the second mold 60, the protrusion portion 905 crushes between the flange portion adjusting member 40B and the second mold 60, and the protrusion portion 906 crushes between the flange portion adjusting member 40C and the second mold 60.

Figure 15:
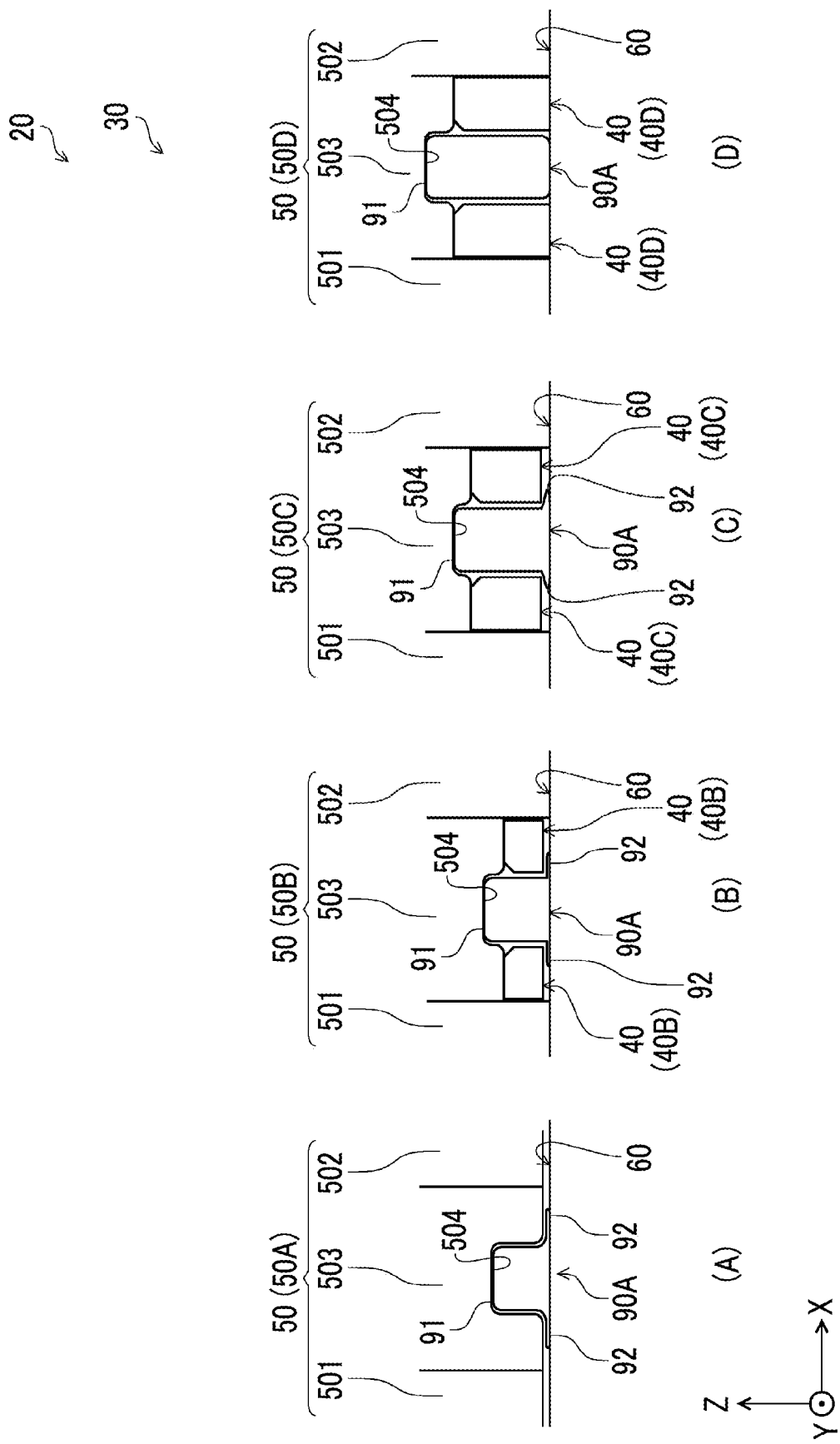
FIG. 15 is a vertical cross-sectional view showing operating states (mold clamping states) of the forming device (first embodiment) in turn.

Next, a gas is supplied into the base material 90' to start a secondary blow. Accordingly, as shown in FIG. 15, the pipe portion 91 is formed over the entire length between each recessed portion 504 and the second mold 60.

In addition, the first mold 50 is further lowered with the secondary blow. Accordingly, the protrusion portion 904 is further crushed between the third member 503 and the second mold 60 and becomes the flange portion 92. The flange portion 92 is the constant width portion 921.

Similarly, the protrusion portion 905 further crushes between the flange portion adjusting member 40B and the second mold 60 and becomes the flange portion 92, and the protrusion portion 906 also crushes between the flange portion adjusting member 40C and the second mold 60 and becomes the flange portion 92. The flange portion 92 is the changing width portion 922.

Next, the automotive member 90A is rapidly cooled. After then, the mold open state is caused again, and the automotive member 90A is taken out.

By going through the process described above, the automotive member 90A can be formed.

In addition, the flange portion 92 is a portion formed in a plate shape as a part of the base material 90' is crushed as described above and pipe walls of the base material 90' overlap each other. Accordingly, in a case where the strength of the automotive member 90A increases at the flange portion 92 and the automotive member is mounted on the automobile, the automotive member can withstand actual use.

In addition, in the forming device 20, since the width W92 of the flange portion 92 cannot be completely adjusted only by adjusting the height of each of the flange portion adjusting members 40 as appropriate, it is possible to adjust the width W92 by adjusting the lowered amount of each third member as appropriate.

Second Embodiment of Automotive Member

Hereinafter, a second embodiment of the flanged member of the present invention will be described with reference to FIG. 16, but a difference from the embodiment described above will be mainly described, and the description on the same matters will be omitted.

As shown in FIG. 16, an automotive member 90B includes the constant cross-section portion 901 and the cross-section changing portion 902. In the cross-section changing portion 902, the perimeter numerical range is satisfied.

In addition, in the cross-section changing portion 902, the tunnel portion 907 communicating with the inside of the pipe portion 91 is formed in a portion made of only the flange portion 92 excluding the pipe portion 91. The tunnel portion 907 functions as an exhaust portion through which a gas in the pipe portion 91 is exhausted when forming the automotive member 90B. A cross-sectional shape of the tunnel portion 907 is a semi-arc shape in the present embodiment, but is not limited thereto.

Second Embodiment of Forming Device

Hereinafter, a second embodiment of the forming device will be described with reference to FIG. 17, but a difference from the embodiment described above will be mainly described, and description on the same matters will be omitted.

The forming device 20 shown in FIG. 17 is a device that forms the automotive member 90B. The forming device 20 has, in the third member 503 of the first mold 50, a groove (tunnel portion forming groove) 505 for forming the tunnel portion 907. The groove 505 is formed along a Y-axis direction, and a cross-sectional shape thereof is a semi-arc shape.

Third Embodiment of Automotive Member

Hereinafter, a third embodiment of the flanged member of the present invention will be described with reference to FIG. 18, but a difference from the embodiment described above will be mainly described, and the description on the same matters will be omitted.

Figure 18:
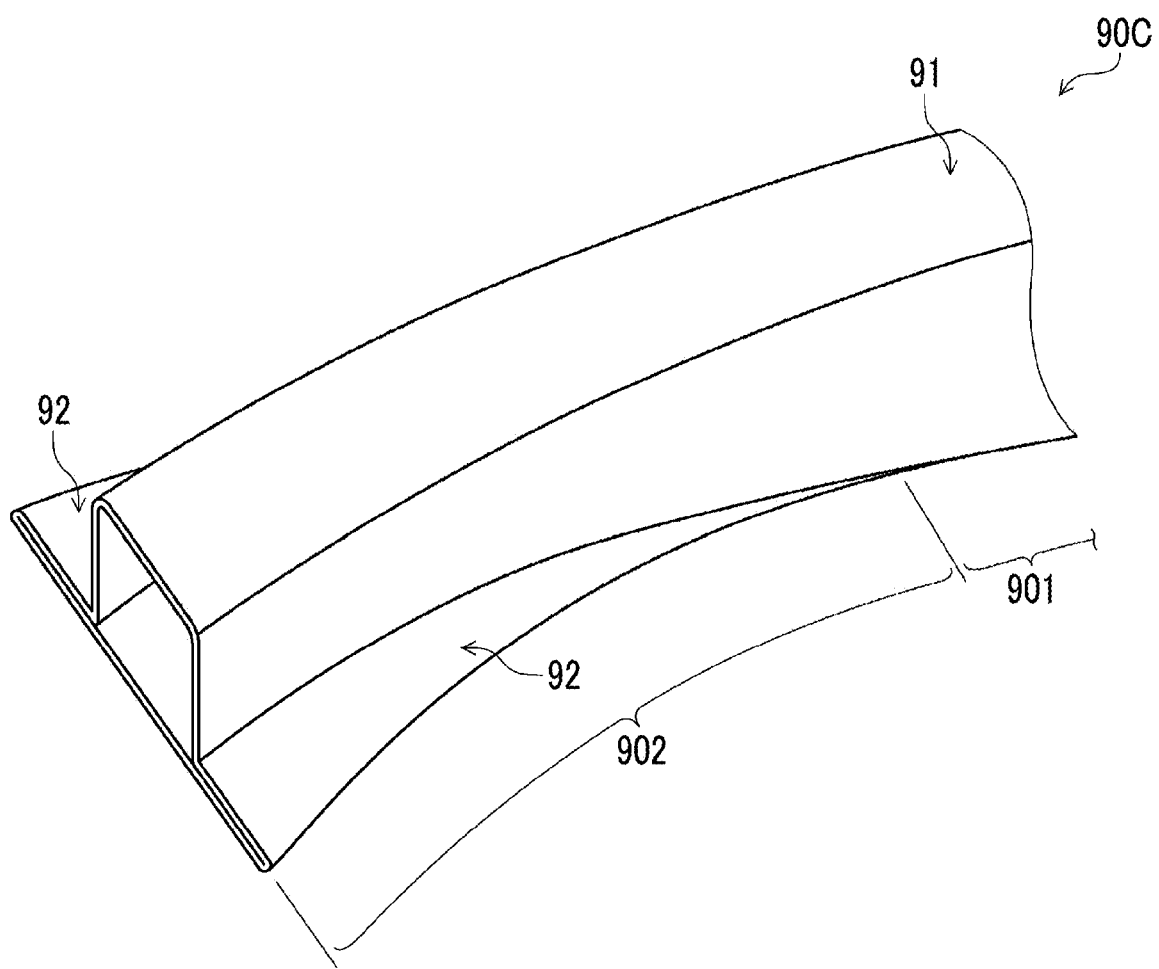
FIG. 18 is a perspective view showing a third embodiment of the automotive member.

As shown in FIG. 18, an automotive member 90C includes the constant cross-section portion 901 and the cross-section changing portion 902. In the cross-section changing portion 902, the perimeter numerical range is satisfied.

In addition, the automotive member 90C is curved downward in FIG. 18 such that at least the cross-section changing portion 902 is in a bow shape.

Fourth Embodiment of Automotive Member

Hereinafter, a fourth embodiment of the flanged member of the present invention will be described with reference to FIG. 19, but a difference from the embodiment described above will be mainly described, and the description on the same matters will be omitted.

Figure 19:
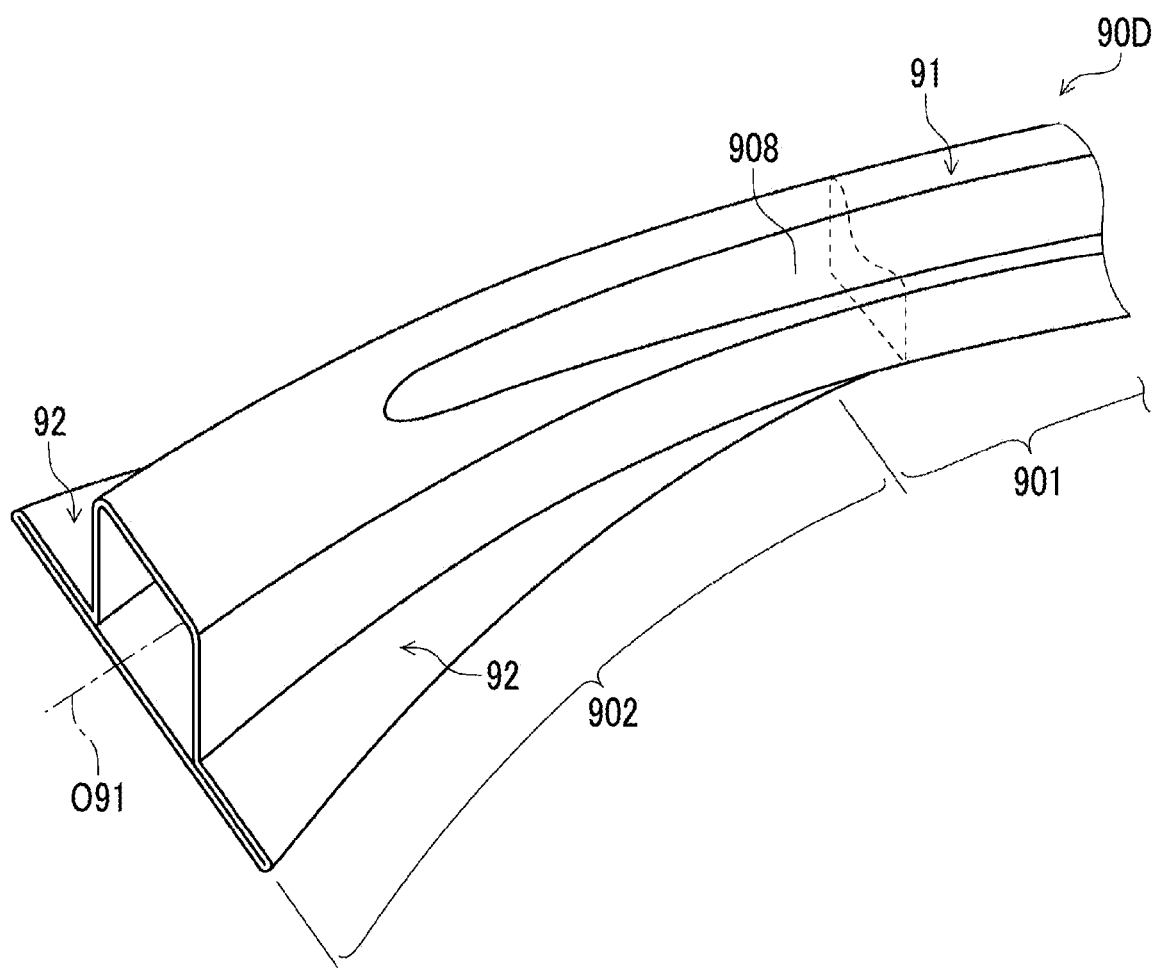
FIG. 19 is a perspective view showing a fourth embodiment of the automotive member.

As shown in FIG. 19, an automotive member 90D includes the constant cross-section portion 901 and the cross-section changing portion 902. In the cross-section changing portion 902, the perimeter numerical range is satisfied.

In addition, the automotive member 90D is curved downward in FIG. 19 such that at least the cross-section changing portion 902 is in a bow shape.

In addition, a groove 908, which is a bead portion, is formed in the pipe portion 91 from the middle of the cross-section changing portion 902 to the constant cross-section portion 901, that is, along the center axis O91. Then, the strength of the automotive member 90D increases by the amount that the groove 908 is formed. A cross-sectional shape of the groove 908 is a semi-arc shape in the present embodiment, but is not limited thereto.

The bead portion is not limited to the groove 908 and may be, for example, a ridge formed along the center axis O91. The strength of the automotive member 90D can be increased by the ridge. As shown in FIG. 19, the flange portion 92 is not provided at the constant cross-section portion 901 provided with the groove 908, which is the bead portion. On the other hand, in the cross-section changing portion 902, the flange portion 92 becomes larger as the depth of the groove 908, which is the bead portion, becomes shallower. Accordingly, the strength of the automotive member 90D can be secured without changing the perimeter.

Third Embodiment of Forming Device

Hereinafter, a third embodiment of the forming device will be described with reference to FIG. 20, but a difference from the embodiment described above will be mainly described, and description on the same matters will be omitted.

Figure 20:
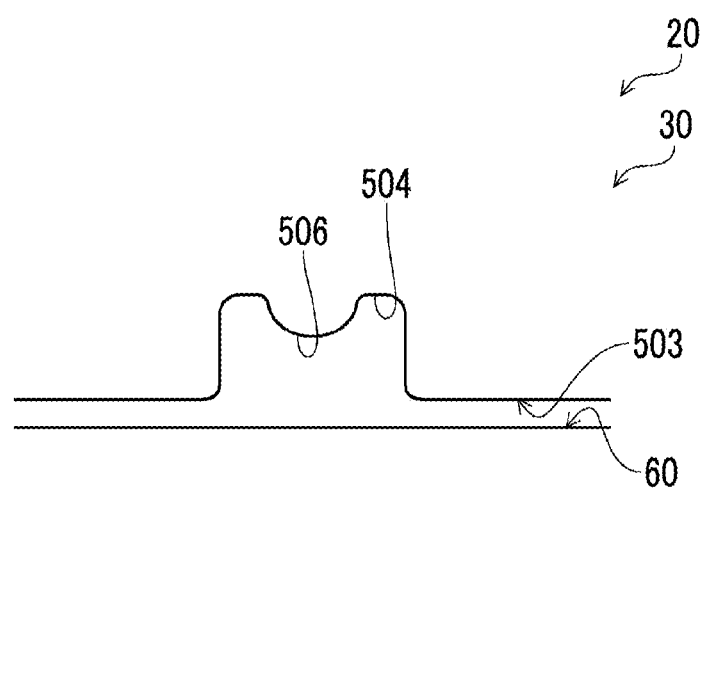
FIG. 20 is a vertical cross-sectional view showing a forming device (third embodiment).

The forming device 20 shown in FIG. 20 is a device that forms the automotive member 90D. In the forming device 20, a ridge (groove forming protruding portion) 506 for forming the groove 908 is formed in the recessed portion 504 of the third member 503 along the Y-axis direction, and a cross-sectional shape thereof is a semi-circular shape.

Fifth Embodiment of Automotive Member

Hereinafter, a fifth embodiment of the flanged member of the present invention will be described with reference to FIG. 21, but a difference from the embodiment described above will be mainly described, and the description on the same matters will be omitted.

Figure 21:
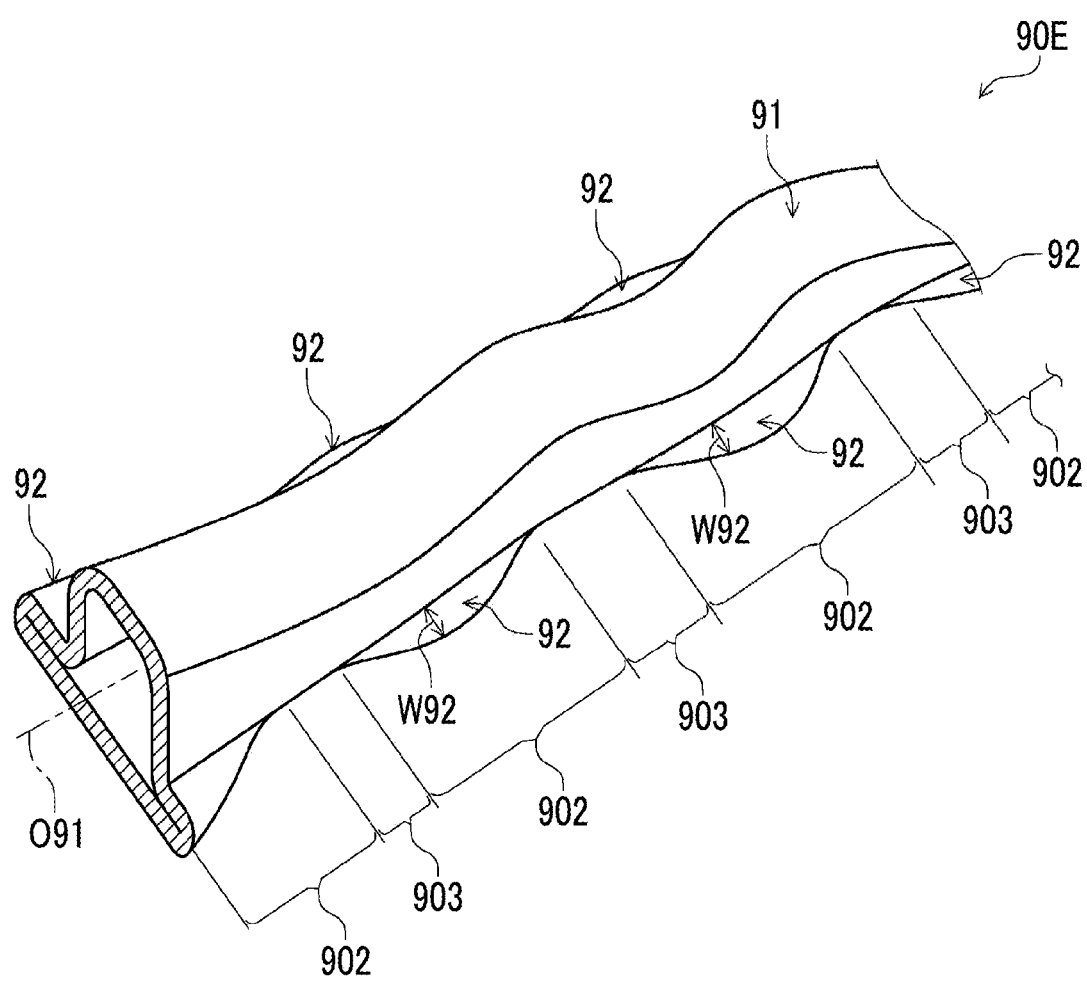
FIG. 21 is a perspective view showing a fifth embodiment of the automotive member.

As shown in FIG. 21, in an automotive member 90E, the cross-section changing portions 902 and the constant cross-section portions 903 are disposed alternately along the center axis O91. In addition, in the cross-section changing portion 902, the width W92 of the flange portion 92 gradually increases from the lower left toward the upper right in FIG. 21, and gradually decreases toward the upper right when the width becomes the maximum.

Fourth Embodiment of Forming Device

Hereinafter, a fourth embodiment of the forming device will be described with reference to FIG. 22, but a difference from the embodiment described above will be mainly described, and description on the same matters will be omitted.

Figure 22:
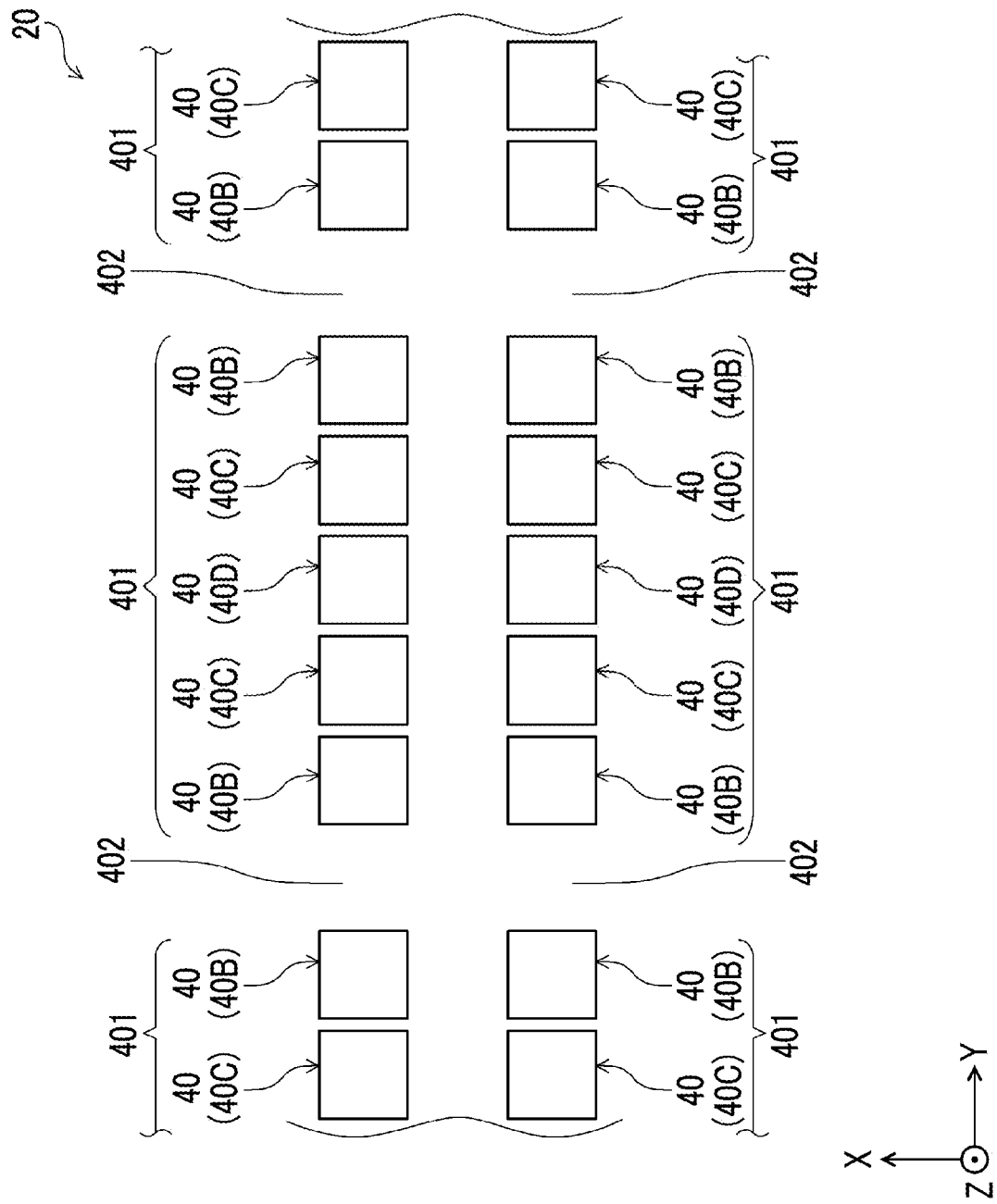
FIG. 22 is a plan view showing a forming device (fourth embodiment).

The forming device 20 shown in FIG. 22 is a device that forms the automotive member 90E. In the forming device 20, the flange portion adjusting member 40B, the flange portion adjusting member 40C, the flange portion adjusting member 40D, the flange portion adjusting member 40C, and the flange portion adjusting member 40B, which are disposed along the Y-axis direction, are defined as one group 401. The group 401 is disposed along the Y-axis direction with an interval 402. The flange portion 92 in the cross-section changing portion 902 is formed by the group 401. In addition, in a portion where there is the interval 402, the constant cross-section portion 903 is formed.

Sixth Embodiment of Automotive Member

Hereinafter, a sixth embodiment of the automotive member will be described with reference to FIGS. 23 and 24.

Figure 23:
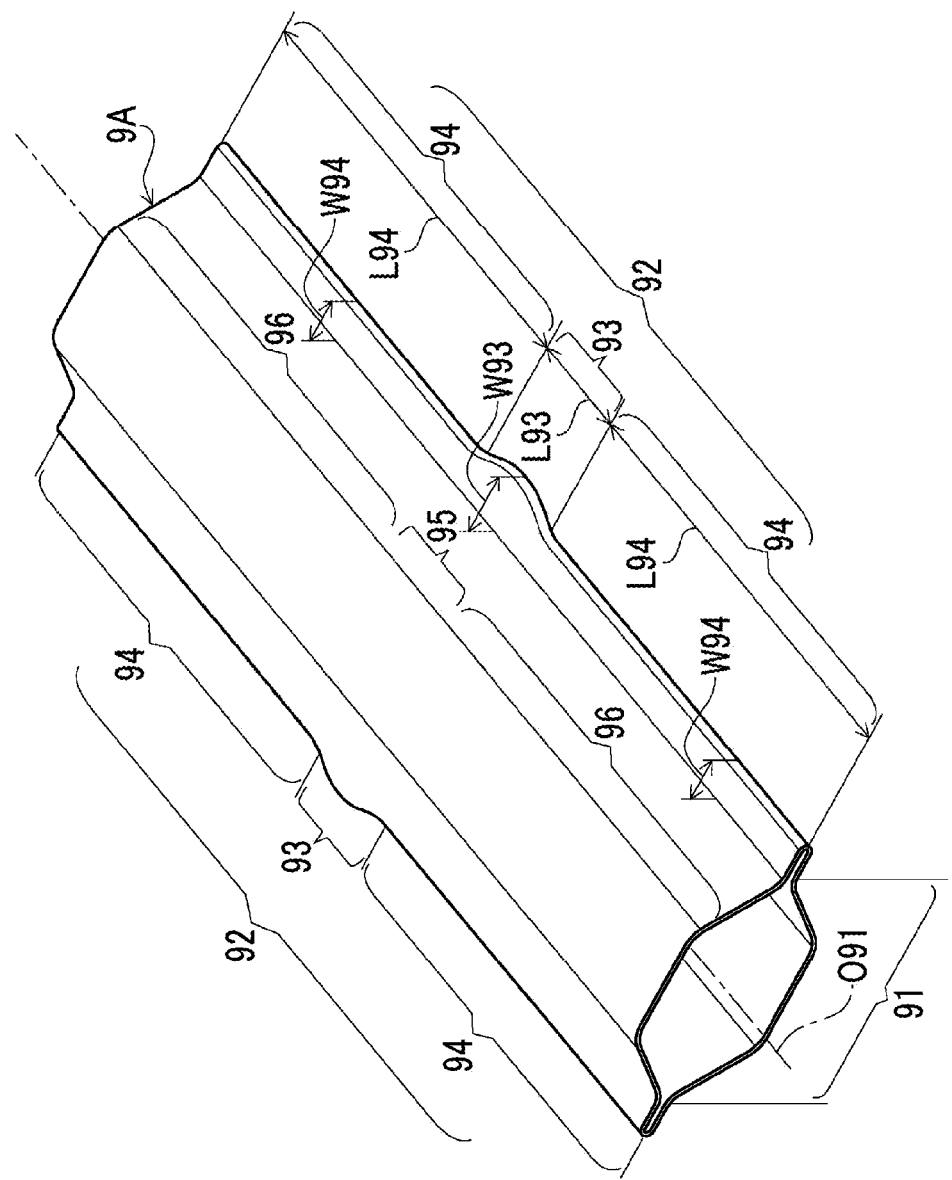
FIG. 23 is a perspective view showing a sixth embodiment of the automotive member.

An automotive member 9A shown in FIG. 23 is a pipe (flanged member), includes the pipe portion 91 and the flange portion 92, and is a member used as a component of the automobile. The automotive member 9A is configured by, for example, a metal material such as an iron-carbon alloy.

The pipe portion 91 is a tubular portion. A cross-sectional shape of the pipe portion 91 is not particularly limited, but is, for example, a non circular ring shape in the present embodiment.

The flange portion 92 protrudes to the outer peripheral portion of the pipe portion 91 and is integrally formed. In the automotive member 9A, the flange portions 92 are formed on both sides of the width direction of the pipe portion 91, respectively, via the center axis O91 of the pipe portion 91. Each of the flange portions 92 protrudes in an opposite direction to each other. Although the automotive member 9A is configured to include two flange portions 92 in the present embodiment, the number of flange portions 92 formed is not limited thereto and may be, for example, one or three or more.

Each of the flange portions 92 is configured to include two flange portions having protruding amounts from the outer peripheral portion of the pipe portion 91, that is, widths different from each other. In the two flange portions, one flange portion will be called a "first flange portion 93", and the other flange portion having a smaller width (protruding amount) W94 than a width (protruding amount) W93 of the first flange portion 93 will be called a "second flange portion 94". Herein, in the present invention, "the width W94 smaller than the width W93" also includes a case where the width W94 becomes zero.

A difference (maximum difference) between the width W93 and the width W94 is not particularly limited.

The first flange portion 93 and the second flange portion 94 are formed at positions different from each other in the center axis O91 direction of the pipe portion 91. In the present embodiment, the first flange portion 93 is formed at a central part in a longitudinal direction (the center axis O91 direction) of the pipe portion 91, and the second flange portions 94 are formed respectively on both end sides thereof.

An entire length L93 of the first flange portion 93 along the center axis O91 direction is shorter than an entire length L94 of the second flange portion 94 along the center axis O91 direction in the present embodiment, but the length is not limited thereto. For example, the entire length L93 may be larger than the entire length L94, or the entire length L93 and the entire length L94 may be the same.

In addition, although the two second flange portions 94 in each of the flange portions 92 have the same entire length L94 in the present embodiment, without being limited thereto, the entire lengths L94 may be different from each other.

In addition, with respect to the pipe portion 91, a portion where the first flange portion 93 is formed to protrude will be called a "first pipe portion 95", and a portion where the second flange portion 94 is formed to protrude will be called a "second pipe portion 96".

Next, an example of a use mode of the automotive member 9A will be described.

The automotive member 9A is used as a part (beam) of a steering support structure 10 that supports steering on a front side of the automobile and peripheral members. The steering support structure 10 is generally called, for example, a "steering member" and an "instrument panel reinforcement" in some cases.

Figure 24:
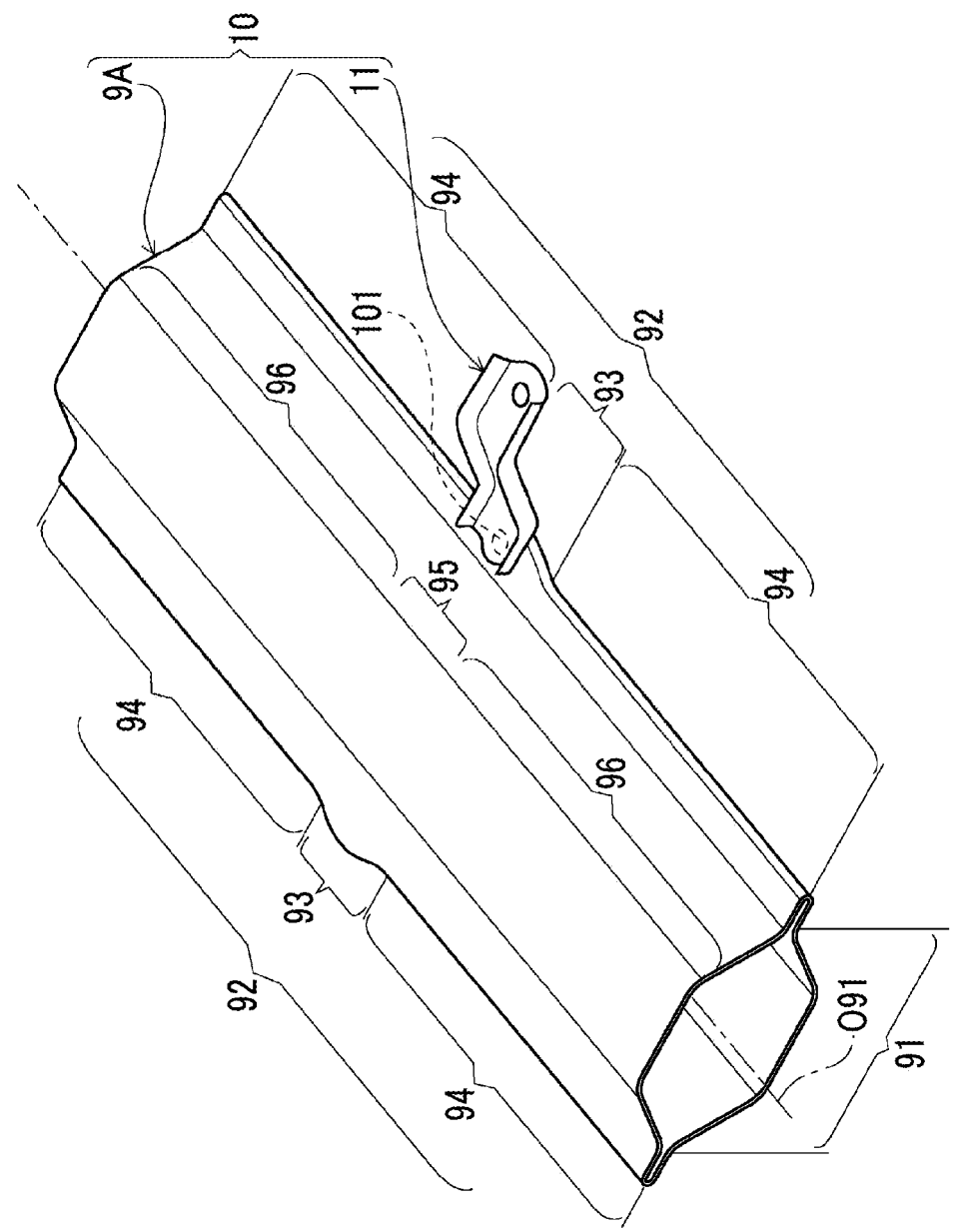
FIG. 24 is a perspective view showing a use example of the automotive member shown in FIG. 23.

As shown in FIG. 24, the steering support structure 10 includes the automotive member 9A and a sheet metal member 11.

The sheet metal member 11 is obtained by machining, such as bending, on a metal plate and is, for example, a member that functions as a bracket or a stay.

The sheet metal member 11 is joined to the first flange portion 93 of the automotive member 9A. The sheet metal member 11 and the first flange portion 93 are joined to each other at one welding place (welding point) 101 in the configuration shown in FIG. 24, but, without being limited thereto, for example, may be joined to each other at a plurality of welding places 101 depending on the sizes of the sheet metal member 11 and the first flange portion 93.

The joining method is not particularly limited, but a method using welding, in particular, spot welding can be used since portions having a plate shape are joined to each other. The spot welding can generally better reduce costs of joining members to each other than arc welding. In addition, a jig that positions members to be joined to each other is usually used in the arc welding, but the use of the jig can be omitted in the spot welding. The automotive member 9A that can use the spot welding as described above is a member excellent in joining workability to another member, that is, the sheet metal member 11 when manufacturing the automobile.

In addition, the width W93 of the first flange portion 93 is the maximum in the flange portion 92, and by the amount, it becomes easier to join to the sheet metal member 11. Due to a synergetic effect of a place where the sheet metal member 11 is joined being the first flange portion 93 having the maximum width W93 and spot welding being able to be used in the joining, joining workability further improves.

Sixth Embodiment of Automotive Member

Hereinafter, the sixth embodiment of the automotive member will be described with reference to FIGS. 25 to 27.

Figure 25:
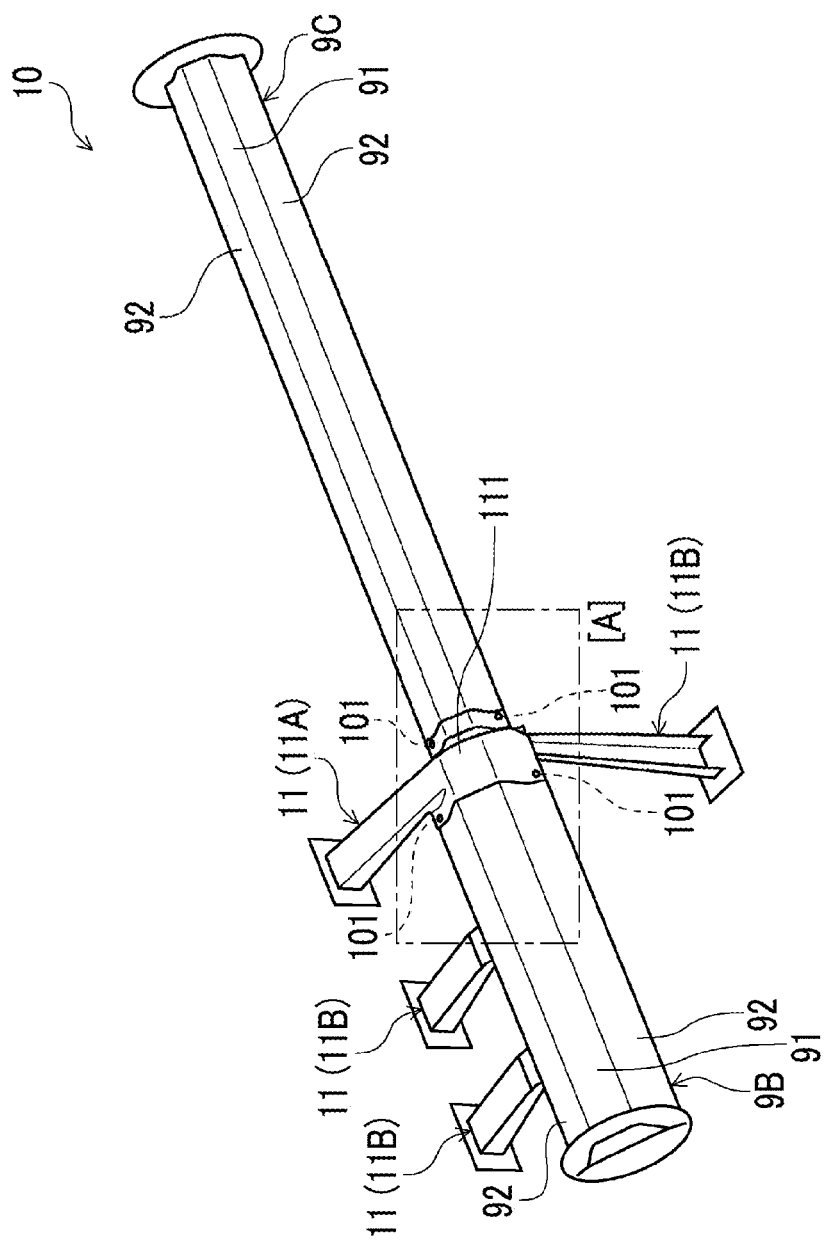
FIG. 25 is a perspective view showing a use example of another automotive member.

As shown in FIG. 25, the steering support structure 10 of the present embodiment includes an automotive member 9B, an automotive member 9C, and four sheet metal members 11.

Figure 26:
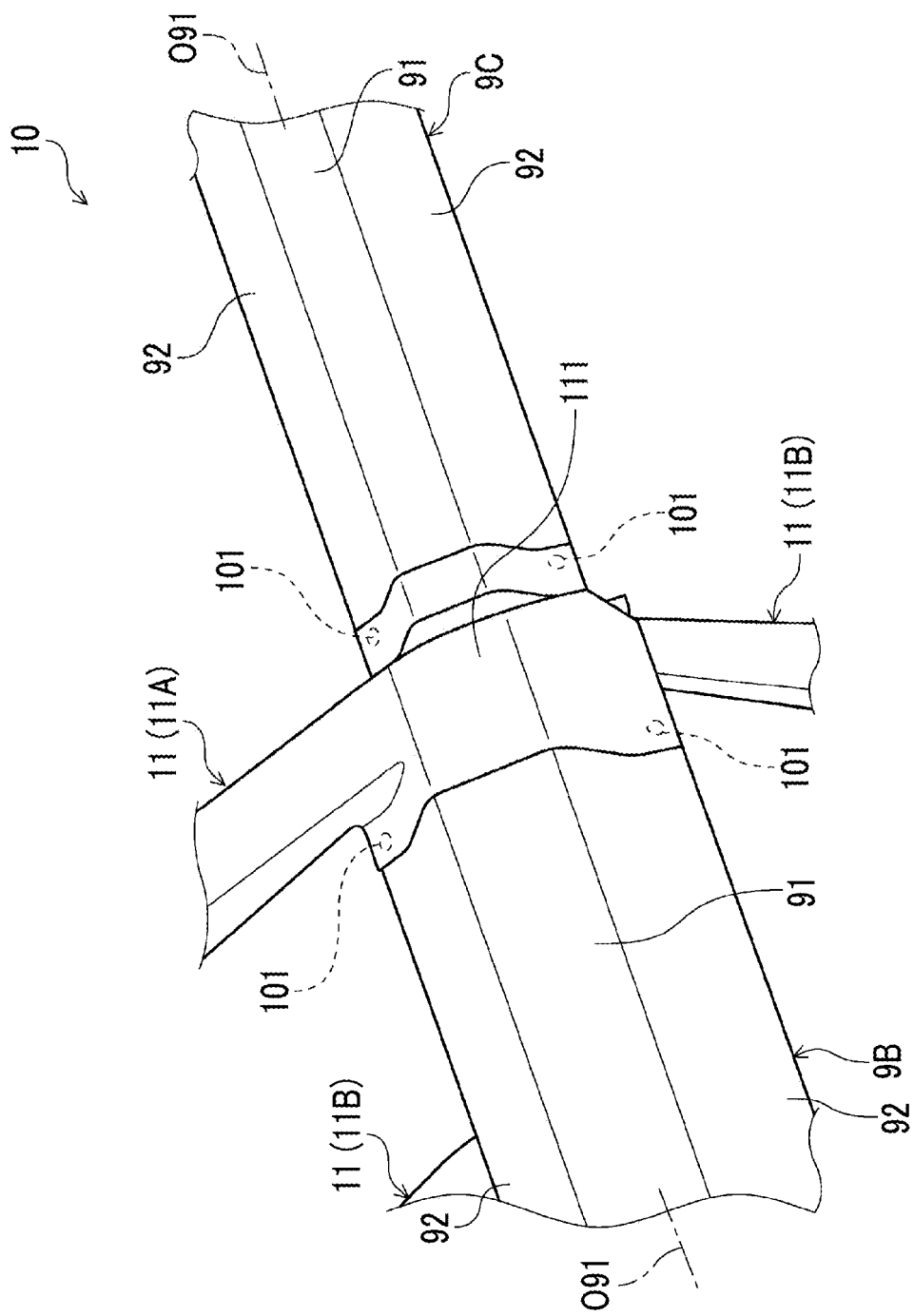
FIG. 26 is an enlarged perspective view of a region [A] surrounded by a two-dot chain line in FIG. 25.
Figure 27:
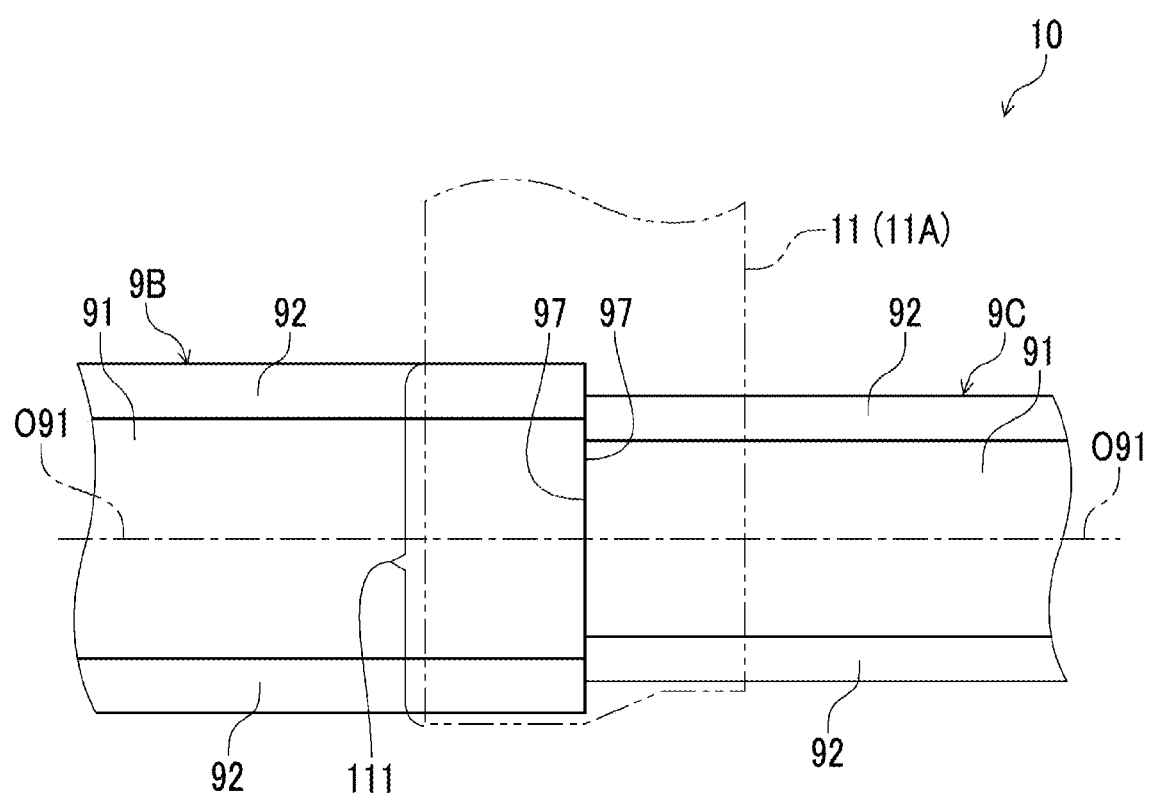
FIG. 27 is an enlarged plan view of the region [A] surrounded by the two-dot chain line in FIG. 25.

As shown in FIG. 26 and FIG. 27, in all of the automotive member 9B and the automotive member 9C, the width of the flange portion 92 is constant along the center axis O91 direction. In addition, the automotive member 9B and the automotive member 9C have thicknesses (widths) different from each other, the automotive member 9B is thicker, and the automotive member 9C is thinner. In the steering support structure 10, the automotive member 9B and the automotive member 9C are arranged along a car width direction of the automobile, and the thicker automotive member 9B is disposed on a driver's seat side of the automobile.

As shown in FIG. 27, end surfaces 97 of the automotive member 9B and the automotive member 9C are abutted against each other, that is, are in contact with each other, and this state is maintained by one sheet metal member 11 (sheet metal member 11A).

The four sheet metal members 11 include one sheet metal member 11A joined to both of the automotive member 9B and the automotive member 9C and three sheet metal members 11B joined to the automotive member 9B. Spot welding is used in joining the sheet metal members 11.

The sheet metal member 11A includes a joint portion 111 that collectively covers end portions of the automotive member 9B and the automotive member 9C and connects the members to each other. The joint portion 111 is a plate-shaped portion having a shape that follows the outer shapes of the automotive member 9B and the automotive member 9C, and is joined to each flange portion 92 of the automotive member 9B and each flange portion 92 of the automotive member 9C. Accordingly, a positional relationship between the automotive member 9B and the automotive member 9C is maintained. The sheet metal member 11A and each flange portion 92 is joined to each other at one welding place 101, but without being limited thereto, may be joined to each other at a plurality of welding places 101.

Each sheet metal member 11B is joined at a desired position of the flange portion 92 of the automotive member 9B. The sheet metal member 11B and each flange portion 92 is joined to each other at one welding place 101 or may be joined to each other at the plurality of welding places 101.

In addition, the number of sheet metal members 11 formed is not limited to four and may be, for example, one to three or 5 or more.

Fifth Embodiment of Forming Device

Hereinafter, a fifth embodiment of the forming device will be described with reference to FIGS. 28 to 32, but a difference from the embodiment described above will be mainly described, and description on the same matters will be omitted.

Figure 28:
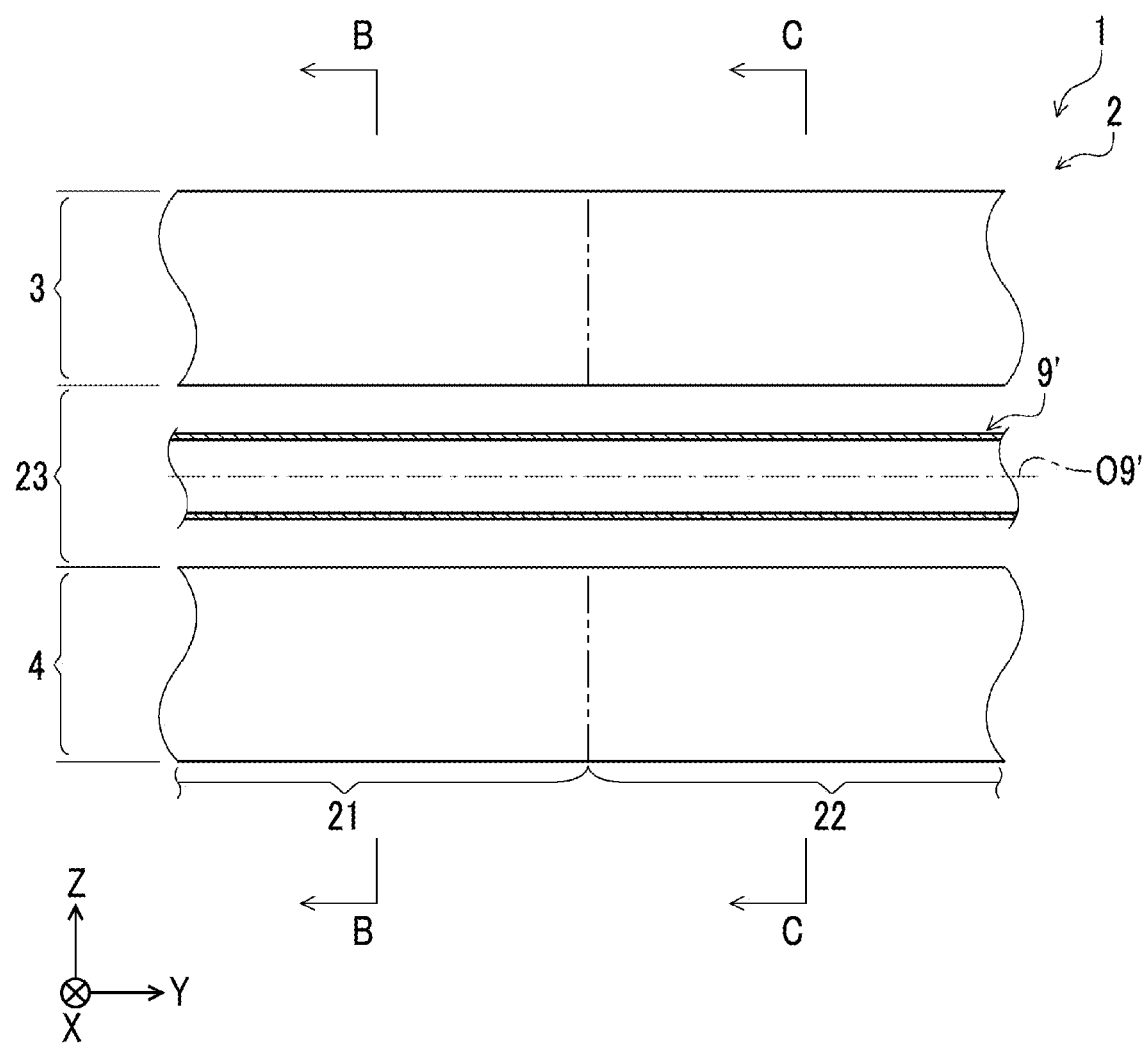
FIG. 28 is a vertical cross-sectional side view showing a fifth embodiment of the forming device.
Figure 29:
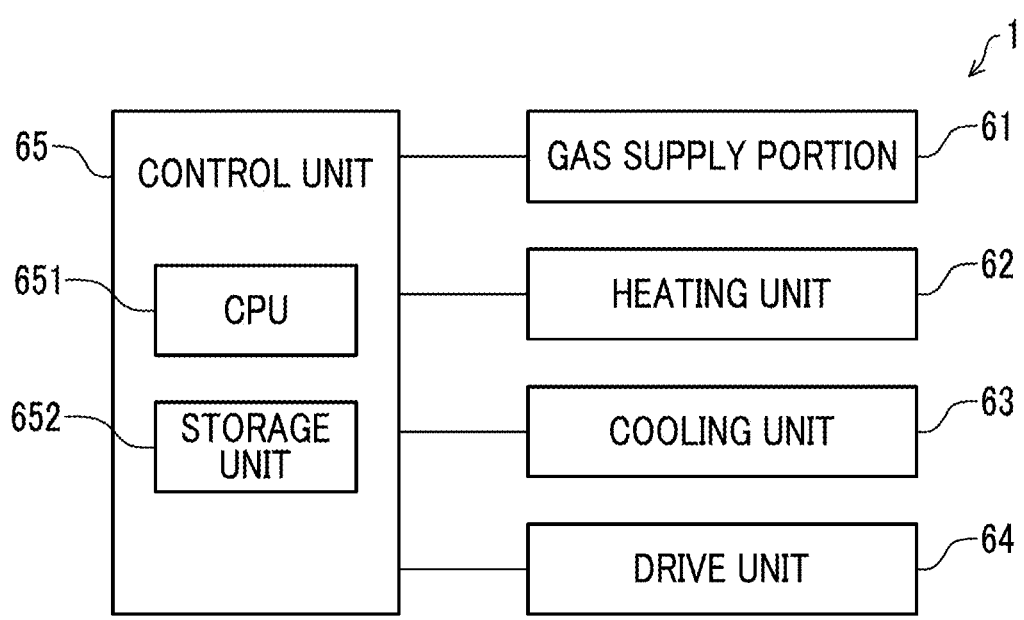
FIG. 29 is a block diagram of the forming device shown in FIG. 28.

As shown in FIG. 28 and FIG. 29, a forming device 1 includes a device main body 2, a gas supply portion 61, a heating unit 62, a cooling unit 63, a drive unit 64, and a control unit 65. The forming device 1 can form a base material 9' having a cylindrical shape at the automotive member 9A.

The device main body 2 includes a first forming portion 21 and a second forming portion 22 which are disposed along the Y-axis direction. Although not shown, in the device main body 2, one second forming portion 22 is disposed on a Y-axis direction positive side of the first forming portion 21, and one second forming portion 22 is disposed on a Y-axis direction negative side of the first forming portion 21. Since the two second forming portions 22 have the same configuration except that disposed places are different from each other, the second forming portion 22 on the Y-axis direction positive side will be described as a representative.

Herein, FIGS. 30 to 32 are vertical cross-sectional views showing operating states of the forming device shown in FIG. 28 in turn. In addition, a cross-sectional view taken along line B-B in FIG. 28 is a cross-sectional view of the first forming portion 21, and a cross-sectional view taken along line C-C is a cross-sectional view of the second forming portion 22.

The first forming portion 21 is a portion that performs a first forming process of forming a part of the base material 9', that is, a central part of the base material 9' in a longitudinal direction (center axis O9' direction) in the present embodiment at the first pipe portion 95 and the first flange portion 93.

The second forming portion 22 is a portion that performs a second forming process of forming a part of the base material 9', that is, one end side (Y-axis direction positive side) of the base material 9' in the present embodiment at the second pipe portion 96 and the second flange portion 94.

The first forming portion 21 and the second forming portion 22 share a first mold 3 and a second mold 4 that can take a mold open state (see FIG. 30), a mold clamping state (see FIG. 32), and an intermediate state (see FIG. 31) between the mold open state and the mold clamping state. Accordingly, in the first forming portion 21 and the second forming portion 22, the first mold 3 and the second mold 4 can operate at the same timing from the mold open state to the mold clamping state. Accordingly, it is possible to smoothly form at the automotive member 9A.

In the device main body 2, the first mold 3 is disposed on the upper side, and the second mold 4 is disposed on the lower side. Then, between the first mold 3 and the second mold 4, a cavity 23 for disposing and accommodating the base material 9' is formed.

In addition, in the present embodiment, both of the first mold 3 and the second mold 4 move in the Z-axis direction and are supported to be capable of approaching and separating from each other. In the device main body 2, the first mold 3 may be fixed and the second mold 4 may be supported to be capable of approaching and separating from the first mold 3, or the second mold 4 may be fixed and the first mold 3 may be supported to be capable of approaching and separating from the second mold 4.

As shown in FIGS. 30 to 32, the first mold 3 has a block shape and includes a lower surface 31 parallel to the XY-plane. In addition, the first mold 3 includes a groove 32 that is formed in the lower surface 31 and follows the Y-axis direction. In the groove 32, each side surface 321 is inclined with respect to the lower surface 31, and an interval between the respective side surfaces 321 gradually increases toward the Z-axis direction negative side. In addition, a bottom surface 322 is formed parallel to the lower surface 31.

The second mold 4 has a block shape and includes an upper surface 41 that is parallel to the XY-plane, that is, faces the lower surface 31 of the first mold 3. In addition, the second mold 4 includes a groove 42 that is formed in the upper surface 41 and follows the Y-axis direction. When viewed from the Z-axis direction, the groove 42 overlaps the groove 32 of the first mold 3. In the groove 42, each side surface 421 is inclined with respect to the upper surface 41, and an interval between the respective side surfaces 421 gradually increases toward the Z-axis direction positive side. In addition, a bottom surface 422 is formed parallel to the upper surface 41.

In addition, the first forming portion 21 includes a flange portion adjusting member 5. As will be described later, the flange portion adjusting member 5 can adjust the width W93 of the first flange portion 93 so as to be larger than the width W94 of the second flange portion 94 when forming the first flange portion 93. In the present embodiment, the first forming portion 21 includes two flange portion adjusting members 5, one flange portion adjusting member 5A is disposed at the first mold 3, and the other flange portion adjusting member 5B is disposed at the second mold 4. The flange portion adjusting members 5 are not limited to being disposed at both of the first mold 3 and the second mold 4, or, for example, the flange portion adjusting member may be disposed at only one of the first mold 3 and the second mold 4.

The flange portion adjusting member 5A is supported by the first mold 3 so as to be movable along the Z-axis direction. The flange portion adjusting member 5A includes a first protrusion portion (protrusion portion) 51, two second protrusion portions 52, and a connecting portion 53 that connects the first protrusion portion 51 and each of the second protrusion portions 52 to each other.

The first protrusion portion 51 protrudes downward from the bottom surface 322 of the groove 32 of the first mold 3.

The second protrusion portions 52 are disposed on the X-axis direction positive side and the X-axis direction negative side of the first protrusion portion 51, respectively. Each of the second protrusion portions 52 protrudes downward from the lower surface 31 of the first mold 3.

When the flange portion adjusting member 5A has moved along the Z-axis direction, the first protrusion portion 51 and each of the second protrusion portions 52 can collectively appear and disappear with respect to the cavity 23. As shown in FIG. 30, in the mold open state, the first protrusion portion 51 and each of the second protrusion portions 52 are in a maximally protruding state. As shown in FIG. 32, in the mold clamping state, the first protrusion portion 51 and each of the second protrusion portions 52 are in a maximally retracted state.

The flange portion adjusting member 5B is supported by the second mold 4 so as to be movable along the Z-axis direction. The flange portion adjusting member 5B includes a first protrusion portion (protrusion portion) 54, two second protrusion portions 55, and a connecting portion 56 that connects the first protrusion portion 54 and each second protrusion portions 55 to each other.

The first protrusion portion 54 protrudes upward from the bottom surface 422 of the groove 42 of the second mold 4.

The second protrusion portions 55 are disposed on the X-axis direction positive side and the X-axis direction negative side of the first protrusion portion 54, respectively. Each of the second protrusion portions 55 protrudes upward from the upper surface 41 of the second mold 4.

When the flange portion adjusting member 5B has moved along the Z-axis direction, the first protrusion portion 54 and each of the second protrusion portions 55 can collectively appear and disappear with respect to the cavity 23. As shown in FIG. 30, in the mold open state, the first protrusion portion 54 and each of the second protrusion portions 55 are in a maximally protruding state. As shown in FIG. 32, in the mold clamping state, the first protrusion portion 54 and each of the second protrusion portions 55 are in a maximally retracted state.

In addition, the first forming portion 21 includes a gas damper 24 built in the first mold 3 and a gas damper 25 built in the second mold 4.

The gas damper 24 is disposed on an opposite side to the first protrusion portion 51 of the flange portion adjusting member 5A and functions as a biasing portion that biases the flange portion adjusting member 5A toward the Z-axis direction negative side. Accordingly, in the mold open state, the first protrusion portion 51 and each of the second protrusion portions 52 are in a maximally protruding state.

The gas damper 25 is disposed on an opposite side to the first protrusion portion 54 of the flange portion adjusting member 5B and functions as a biasing portion that biases the flange portion adjusting member 5B toward the Z-axis direction positive side. Accordingly, in the mold open state, the first protrusion portion 54 and each of the second protrusion portions 55 are in a maximally protruding state.

In the forming device 1, for example, a compression spring can also be used instead of the gas damper 24 and the gas damper 25.

The heating unit 62 is a portion that performs a heating process of heating the base material 9'. A configuration of the heating unit 62 is not particularly limited and, for example, can be a configuration where two electrodes electrically connected to the base material 9' and a voltage applying unit that applies a voltage between the electrodes are included. Accordingly, prior to forming by the first forming portion 21 and forming by the second forming portion 22, the base material 9' is brought into an energization state, and the base material 9' can be heated and softened.

The gas supply portion 61 is a portion that performs a gas supply process of supplying a high pressure gas into the base material 9'. Accordingly, the base material 9' can be prevented from excessively crushing when forming by the first forming portion 21 and forming by the second forming portion 22 are being performed respectively in a mold clamping state of the first mold 3 and the second mold 4. A configuration of the gas supply portion 61 is not particularly limited and can be, for example, a configuration where a compressor is included.

The cooling unit 63 is a portion that performs a cooling process of rapidly cooling the automotive member 9A (base material 9'). A configuration of the cooling unit 63 is not particularly limited and can be, for example, a configuration of being provided at each of the first mold 3 and the second mold 4 and including a flow path through which a refrigerant passes. When the refrigerant has passed through the flow path, the automotive member 9A can be rapidly cooled for each of the first mold 3 and the second mold 4. The refrigerant may be either a liquid or a gas.

The drive unit 64 can move the first mold 3 and the second mold 4 so that the first mold 3 and the second mold 4 approach and separate from each other. Accordingly, the drive unit can switch between the mold open state and the mold clamping state. A configuration of the drive unit 64 is not particularly limited and can be, for example, a configuration of including a motor, a ball screw connected to the motor, and a linear guide connected to the ball screw.

The control unit 65 controls operations of the gas supply portion 61, the heating unit 62, the cooling unit 63, and the drive unit 64. A configuration of the control unit 65 is not particularly limited and can be, for example, a configuration of including a CPU 651 and a storage unit 652. The CPU 651 can execute, for example, a control program stored in advance in the storage unit 652. The control program includes, for example, a program for controlling operating conditions (operating timings) of the gas supply portion 61, the heating unit 62, the cooling unit 63, and the drive unit 64 and forming the base material 9' at the automotive member 9A.

The forming device 1 operates as follows.

First, as shown in FIG. 30, the base material 9' is disposed between the first mold 3 and the second mold 4, that is, in the cavity 23 with the first mold 3 and the second mold 4 in the mold open state. In this case, as described above, in the first forming portion 21, the first protrusion portion 51 on a first mold 3 side and each of the second protrusion portions 52 are in the maximally protruding state, and the first protrusion portion 54 on a second mold 4 side and each of the second protrusion portions 55 are also in the maximally protruding state (see the cross-sectional view taken along line B-B of FIG. 30). On the other hand, the first protrusion portion 51 is not provided at the second forming portion 22 (see the cross-sectional view taken along line C-C of FIG. 30).

Next, the heating unit 62 is operated while maintaining the mold open state. Accordingly, the base material 9' can be softened.

Next, the drive unit 64 is operated, and as shown in FIG. 31, the first mold 3 and the second mold 4 are brought into the intermediate state where the first mold and the second mold have approached each other from the state shown in FIG. 30. Accordingly, an upper portion of the base material 9' can enter the groove 32 of the first mold 3 deeper than the state shown in FIG. 30, and a lower portion thereof can enter the groove 42 of the second mold 4 deeper than the state shown in FIG. 30.

In addition, in this case, in the first forming portion 21, an end surface 511 of the first protrusion portion 51 comes into contact with the base material 9' from above, and an end surface 541 of the first protrusion portion 54 comes into contact with the base material 9' from below. On the other hand, in the second forming portion 22 (the cross-sectional view taken along line C-C of FIG. 31), the bottom surface 322 of the groove 32 comes into contact with the base material 9' from above, and the bottom surface 422 of the groove 42 comes into contact with the base material 9' from below. A separation distance SD1 between the end surface 511 of the first protrusion portion 51 and the end surface 541 of the first protrusion portion 54 is shorter than a separation distance SD2 between the bottom surface 322 of the groove 32 and the bottom surface 422 of the groove 42. Accordingly, the base material 9' is crushed more between the end surface 511 of the first protrusion portion 51 and the end surface 541 of the first protrusion portion 54 than between the bottom surface 322 of the groove 32 and the bottom surface 422 of the groove 42.

In addition, in the state shown in FIG. 31, the gas supply portion 61 is operated to perform a primary blow. Then, the primary blow and crushing between the end surface 511 of the first protrusion portion 51 and the end surface 541 of the first protrusion portion 54 are combined, and the base material 9' expands in the X-axis direction at the first forming portion 21 (the cross-sectional view taken along line B-B of FIG. 31) rather than at the second forming portion 22 (the cross-sectional view taken along line C-C of FIG. 31). Due to this expansion, the base material 9' has a portion 93' that becomes the first flange portion 93 and is larger than a portion 94' that becomes the second flange portion 94 and can enter between the lower surface 31 of the first mold 3 and the upper surface 41 of the second mold 4. Accordingly, in the subsequent mold clamping state, the first flange portion 93 in which the portion 93' is crushed without excess or deficiency and which has the large width W93 and the second flange portion 94 in which the portion 94' is crushed and which has the small width W94 can be formed.

Next, the mold clamping state shown in FIG. 32 is caused, and the gas supply portion 61 is operated to perform a secondary blow. The secondary blow has a larger supply amount of a high pressure air into the base material 9' or a higher pressure of a high pressure air than the primary blow.

In the mold clamping state, the base material 9' can enter the groove 32 of the first mold 3 and the groove 42 of the second mold 4 even deeper. Accordingly, the base material 9' follows the shapes of the groove 32 and the groove 42, and the first pipe portion 95 and the second pipe portion 96 are formed at the base material 9'. In addition, between the first mold 3 and the second mold 4, the portion 93' described above is completely crushed so that the first flange portion 93 can be reliably formed, and the portion 94' described above is completely crushed so that the second flange portion 94 can be reliably formed.

In addition, in this case, in the flange portion adjusting member 5A, the first protrusion portion 51 is pressed to the Z-axis direction positive side by the base material 9', and each of the second protrusion portions 52 is pressed to the Z-axis direction positive side by the upper surface 41 of the second mold 4. Accordingly, the flange portion adjusting member 5A moves to the Z-axis direction positive side against a biasing force of the gas damper 24. On the other hand, in the flange portion adjusting member 5B, the first protrusion portion 54 is pressed to the Z-axis direction negative side by the base material 9', and each of the second protrusion portions 55 is pressed to the Z-axis direction negative side by the lower surface 31 of the first mold 3. Accordingly, the flange portion adjusting member 5B moves to the Z-axis direction negative side against a biasing force of the gas damper 25.

Due to such a mold clamping state, the base material 9' is formed at the automotive member 9A including the first pipe portion 95, the first flange portion 93, the second pipe portion 96, and the second flange portion 94. The first pipe portion 95 and the second pipe portion 96 are formed at positions different from each other in the center axis O9' (the center axis O91) direction of the base material 9', but are portions that have a tubular shape different from the base material 9', that is, have a tubular shape of which a cross-sectional shape is non-circular. The first flange portion 93 protrudes to an outer peripheral portion of the first pipe portion 95 and is integrally formed. The second flange portion 94 protrudes to an outer peripheral portion of the second pipe portion 96 and is integrally formed. The width W93 of the first flange portion 93 is larger than the width W94 of the second flange portion 94.

The entire length L93 of the first flange portion 93 follows the length of the first forming portion 21 along the Y-axis direction, and the entire length L94 of the second flange portion 94 follows the length of the second forming portion 22 in the Y-axis direction.

Next, the cooling unit 63 is operated to rapidly cool the automotive member 9A.

Due to the secondary blow, when the base material 9' comes into close contact with the first mold 3 and the second mold 4, the base material 9' is quenched. Accordingly, the base material 9' transforms from austenite to martensite and becomes the automotive member 9A, which is the final molding product, as it is.

Next, the mold open state is caused again, and the automotive member 9A is taken out.

As described above, the automotive member 9A can be quickly and accurately formed by using the forming device 1. As described above, the automotive member 9A obtained from the forming device 1 is a member excellent in joining workability when manufacturing the automobile.

In addition, in the forming device 1, the width W93 of the first flange portion 93 in the mold clamping state is determined according to the levels of maximum protruding amounts of the first protrusion portion 51 and the first protrusion portion 54 in the mold open state. Accordingly, the larger the maximum protruding amounts of the first protrusion portion 51 and the first protrusion portion 54, the larger the width W93 of the first flange portion 93. Conversely, when the maximum protruding amounts of the first protrusion portion 51 and the first protrusion portion 54 are reduced, the width W93 of the first flange portion 93 can also be reduced accordingly.

Sixth Embodiment of Forming Device

Hereinafter, a sixth embodiment of the forming device will be described with reference to FIGS. 33 to 36, but a difference from the embodiment described above will be mainly described, and description on the same matters will be omitted.

Figure 33:
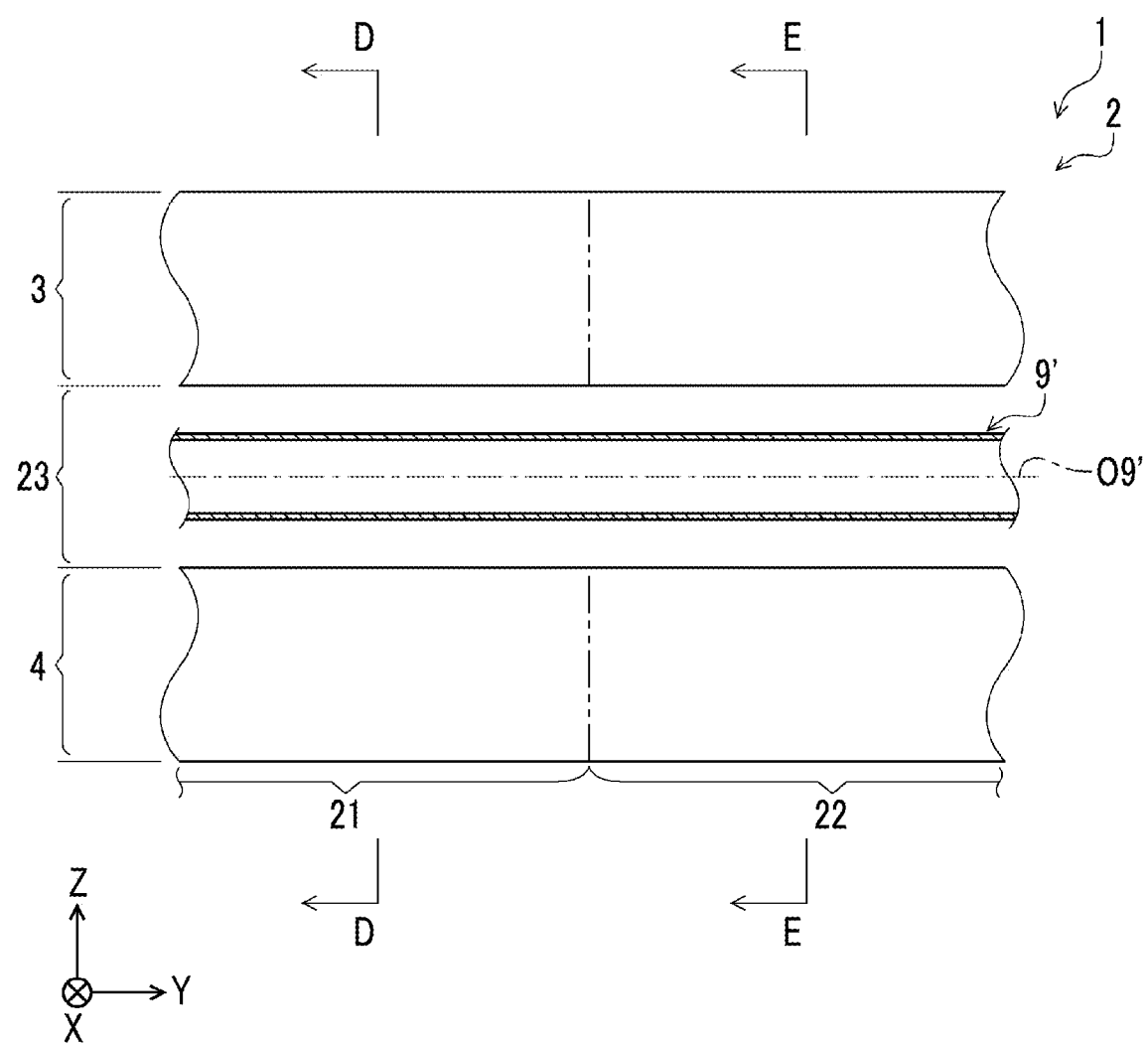
FIG. 33 is a vertical cross-sectional side view showing a sixth embodiment of the forming device.

The forming device 1 of the present embodiment shown in FIG. 33 includes the device main body 2. The device main body 2 includes the first forming portion 21 and the second forming portion 22 that include internal structures shown in FIGS. 34 to 36.

Figure 36:
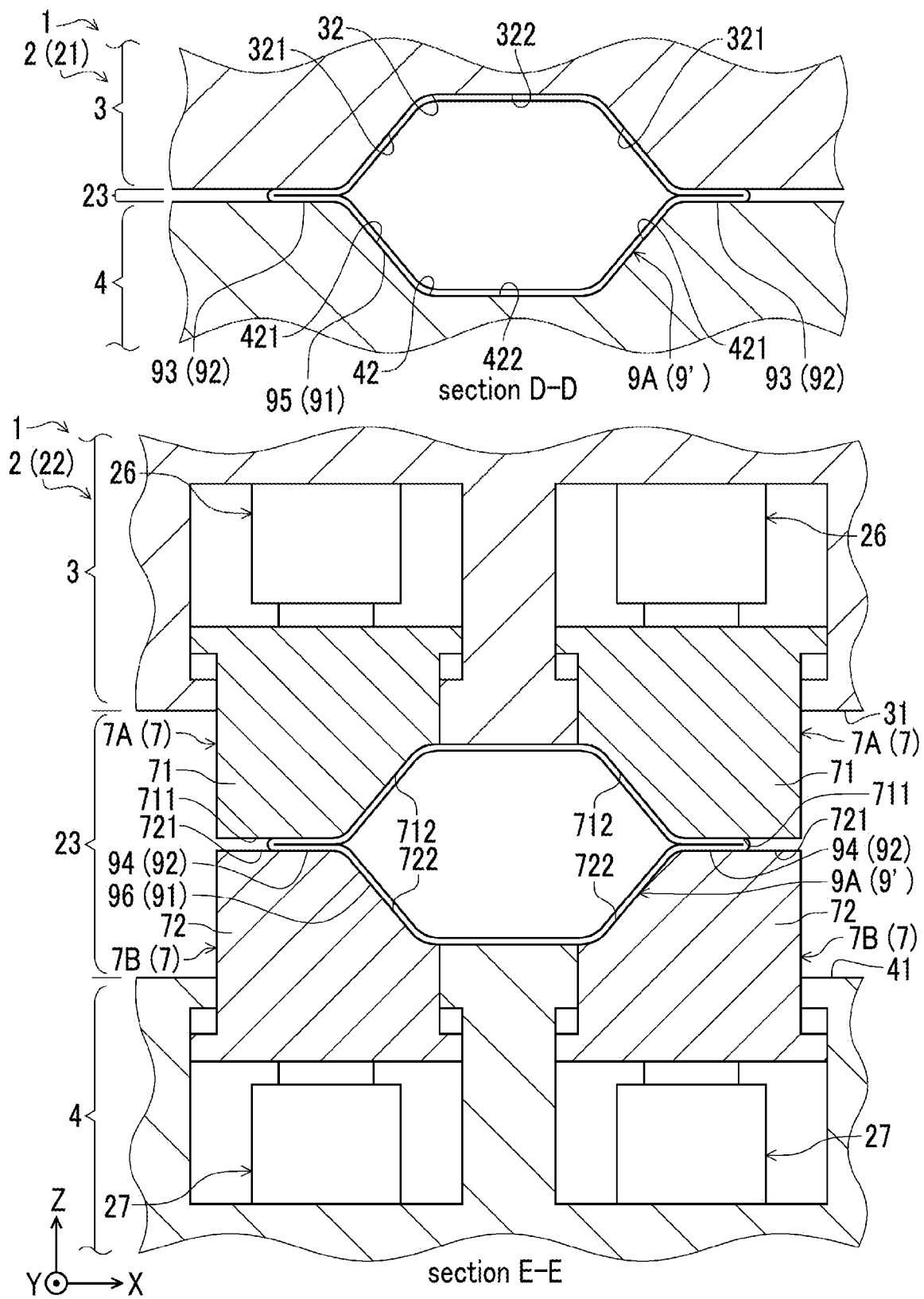
FIG. 36 is a vertical cross-sectional view (the cross-sectional view taken along line D-D and the cross-sectional view taken along line E-E in FIG. 33) showing an operating state (mold clamping state) of the forming device shown in FIG. 33 in turn.

As shown in FIGS. 34 to 36, in the first forming portion 21, the first mold 3 includes the lower surface 31 parallel to the XY-plane and the groove 32 formed in the lower surface 31. In addition, the second mold 4 includes the upper surface 41 parallel to the XY-plane and the groove 42 formed in the upper surface 41.

The second forming portion 22 includes a flange portion adjusting member 7. As will be described later, the flange portion adjusting member 7 can adjust the width W94 of the second flange portion 94 so as to be smaller than the width W93 of the first flange portion 93 when forming the second flange portion 94. In the present embodiment, the second forming portion 22 includes, as the flange portion adjusting member 7, two flange portion adjusting members 7A disposed at the first mold 3 and two flange portion adjusting members 7B disposed at the second mold 4. The flange portion adjusting members 7 are not limited to being disposed at both of the first mold 3 and the second mold 4, or, for example, the flange portion adjusting member may be disposed at only one of the first mold 3 and the second mold 4.

The two flange portion adjusting members 7A are disposed to be separated from each other in the X-axis direction. Since the two flange portion adjusting members 7A have the same configuration except that disposed places are different from each other, hereinafter, the flange portion adjusting member 7A on the X-axis direction positive side will be described as a representative.

The flange portion adjusting member 7A is supported by the first mold 3 so as to be movable along the Z-axis direction. The flange portion adjusting member 7A includes a protrusion portion 71.

The protrusion portion 71 protrudes downward from the lower surface 31 of the first mold 3. In addition, the protrusion portion 71 includes an end surface 711 parallel to the XY-plane and an inclined surface 712 that faces a base material 9' side disposed in the cavity 23 and is inclined with respect to the end surface 711. The inclined surface 712 is inclined to the same degree as the side surface 321 of the groove 32 and overlaps the side surface 321 when viewed from the Y-axis direction in the mold clamping state. In addition, between the two flange portion adjusting members 7A, an interval between the inclined surfaces 712 gradually increases toward the Z-axis direction negative side.

When the flange portion adjusting member 7A has moved along the Z-axis direction, the protrusion portion 71 can collectively appear and disappear with respect to the cavity 23. As shown in FIG. 34, in the mold open state, the protrusion portion 71 is in a maximally protruding state. As shown in FIG. 36, in the mold clamping state, the protrusion portion 71 is in a maximally retracted state.

Similar to the flange portion adjusting member 7A, the two flange portion adjusting members 7B are disposed to be separated from each other in the X-axis direction. Since the two flange portion adjusting members 7B have the same configuration except that disposed places are different from each other, hereinafter, the flange portion adjusting member 7B on the X-axis direction positive side will be described as a representative.

The flange portion adjusting member 7B is supported by the second mold 4 so as to be movable along the Z-axis direction. The flange portion adjusting member 7B includes a protrusion portion 72.

The protrusion portion 72 protrudes upward from the upper surface 41 of the second mold 4. The protrusion portion 72 includes an end surface 721 that is parallel to the XY-plane, that is, faces the end surface 711 of the flange portion adjusting member 7A positioned on the X-axis direction positive side. In addition, the protrusion portion 72 includes an inclined surface 722 that faces the base material 9' side disposed in the cavity 23 and is inclined with respect to the end surface 721. The inclined surface 722 is inclined to the same degree as the side surface 421 of the groove 42 and overlaps the side surface 421 when viewed from the Y-axis direction in the mold clamping state. In addition, between the two flange portion adjusting members 7B, an interval between the inclined surfaces 722 gradually decreases toward the Z-axis direction negative side.

When the flange portion adjusting member 7B has moved along the Z-axis direction, the protrusion portion 72 can collectively appear and disappear with respect to the cavity 23. As shown in FIG. 34, in the mold open state, the protrusion portion 72 is in a maximally protruding state similarly to the protrusion portion 71. As shown in FIG. 36, in the mold clamping state, the protrusion portion 72 is in a maximally retracted state similarly to the protrusion portion 71.

In addition, the first forming portion 21 includes two gas dampers 26 built in the first mold 3 and two gas dampers 27 built in the second mold 4.

Each gas damper 26 is disposed on an opposite side to the protrusion portion 71 of the flange portion adjusting member 7A and functions as a biasing portion that biases the flange portion adjusting member 7A toward the Z-axis direction negative side. Accordingly, in the mold open state, the protrusion portion 71 is maintained in a maximally protruding state.

The two flange portion adjusting members 7A may be connected to each other. Accordingly, the number of gas dampers 26 disposed can be one.

Each gas damper 27 is disposed on an opposite side to the protrusion portion 72 of the flange portion adjusting member 7B and functions as a biasing portion that biases the flange portion adjusting member 7B toward the Z-axis direction positive side. Accordingly, in the mold open state, the protrusion portion 72 is maintained in a maximally protruding state.

The two flange portion adjusting members 7B may be connected to each other. Accordingly, the number of gas dampers 27 disposed can be one.

Next, an operation of the forming device 1 will be described.

First, as shown in FIG. 34, the base material 9' is disposed between the first mold 3 and the second mold 4, that is, in the cavity 23 with the first mold 3 and the second mold 4 in the mold open state. In this case, as described above, in the second forming portion 22, the protrusion portion 71 on the first mold 3 side is in a maximally protruding state, and the protrusion portion 72 on the second mold 4 side is also in a maximally protruding state (see a cross-sectional view taken along line E-E of FIG. 30). On the other hand, the protrusion portion 71 is not provided at the first forming portion 21 (see a cross-sectional view taken along line D-D of FIG. 34).

Next, the heating unit 62 is operated while maintaining the mold open state. Accordingly, the base material 9' can be softened.

Next, the drive unit 64 is operated, and as shown in FIG. 35, the first mold 3 and the second mold 4 are brought into the intermediate state where the first mold and the second mold have approached each other from the state shown in FIG. 34. Accordingly, in the first forming portion 21, the base material 9' can enter the groove 32 of the first mold 3 and the groove 42 of the second mold 4 even deeper. In addition, in the second forming portion 22, the base material 9' can enter even deeper between the flange portion adjusting members 7A and between the flange portion adjusting members 7B.

In addition, in the state shown in FIG. 35, the gas supply portion 61 is operated to perform a primary blow. In this case, a separation distance SD4 between the end surface 711 of the flange portion adjusting member 7A (protrusion portion 71) and the end surface 721 of the flange portion adjusting member 7B (protrusion portion 72) in the second forming portion 22 is shorter than a separation distance SD3 between the lower surface 31 of the first mold 3 and the upper surface 41 of the second mold 4 in the first forming portion 21. Accordingly, an entering amount by which the portion 94' that becomes the second flange portion 94 enters between the end surface 711 and the end surface 721 can be made, that is, reduced smaller than an entering amount by which the portion 93' that becomes the first flange portion 93 enters between the lower surface 31 and the upper surface 41. Accordingly, in the subsequent mold clamping state, the portion 93' and the portion 94' are crushed without excess or deficiency, and the first flange portion 93 and the second flange portion 94 having widths different from each other can be formed. That is, in the mold clamping state, the first flange portion 93 having the large width W93 and the second flange portion 94 having the small width W94 can be formed.

Next, the mold clamping state shown in FIG. 36 is caused, and the gas supply portion 61 is operated to perform a secondary blow.

In the first forming portion 21 in the mold clamping state, the base material 9' can enter the groove 32 of the first mold 3 and the groove 42 of the second mold 4 even deeper. In addition, the portion 93' can be completely crushed between the first mold 3 and the second mold 4.

On the other hand, in the second forming portion 22, the base material 9' can enter even deeper between the flange portion adjusting members 7A and between the flange portion adjusting members 7B. Accordingly, the first pipe portion 95 and the second pipe portion 96 are formed at the base material 9'.

In addition, in this case, the protrusion portion 71 of each flange portion adjusting member 7A is pressed to the Z-axis direction positive side by the base material 9'. Accordingly, each flange portion adjusting member 7A moves to the Z-axis direction positive side against a biasing force of the gas damper 26. In addition, the protrusion portion 72 of each flange portion adjusting member 7B is pressed to the Z-axis direction negative side by the base material 9'. Accordingly, each flange portion adjusting member 7B moves to the Z-axis direction negative side against a biasing force of the gas damper 27. In addition, the portion 94' can be completely crushed between the flange portion adjusting member 7A and the flange portion adjusting member 7B.

Due to such a mold clamping state, the base material 9' is formed at the automotive member 9A in which the width W93 of the first flange portion 93 is larger than the width W94 of the second flange portion 94.

Next, the cooling unit 63 is operated to rapidly cool the automotive member 9A.

Due to the secondary blow, as in the first embodiment, when the base material 9' comes into close contact with the first mold 3 and the second mold 4, the base material 9' is quenched. Accordingly, the base material 9' transforms from austenite to martensite and becomes the automotive member 9A, which is the final molding product, as it is.

Next, the mold open state is caused again, and the automotive member 9A is taken out. Accordingly, the automotive member 9A can be obtained.

In addition, in the forming device 1, the width W94 of the second flange portion 94 is determined according to the length of the separation distance SD4 between the protrusion portion 71 and the protrusion portion 72 in the intermediate state. Accordingly, the smaller the separation distance SD4, the smaller the width W94 of the second flange portion 94. For example, when the separation distance SD4 is set to zero, the formation of the second flange portion 94 is omitted, that is, the width W94 is set to zero, so that the formation of the second flange portion 94 can be restricted. Accordingly, the presence or absence of the second flange portion 94 can be selected according to a place where the automotive member 9A is to be used (use) in the automobile.

Seventh Embodiment of Forming Device

Hereinafter, a seventh embodiment of the forming device will be described with reference to FIGS. 37 to 41, but a difference from the embodiment described above will be mainly described, and description on the same matters will be omitted.

As shown in FIGS. 37 to 41, in the present embodiment, the forming device 1 includes a first device main body 2A that forms a primary base material 9-1' into a secondary base material 9-2' and a second device main body 2B that forms the secondary base material (base material) 9-2' into the automotive member 9A. The first device main body 2A and the second device main body 2B may be separate bodies or may be integrated with each other.

Figure 37:
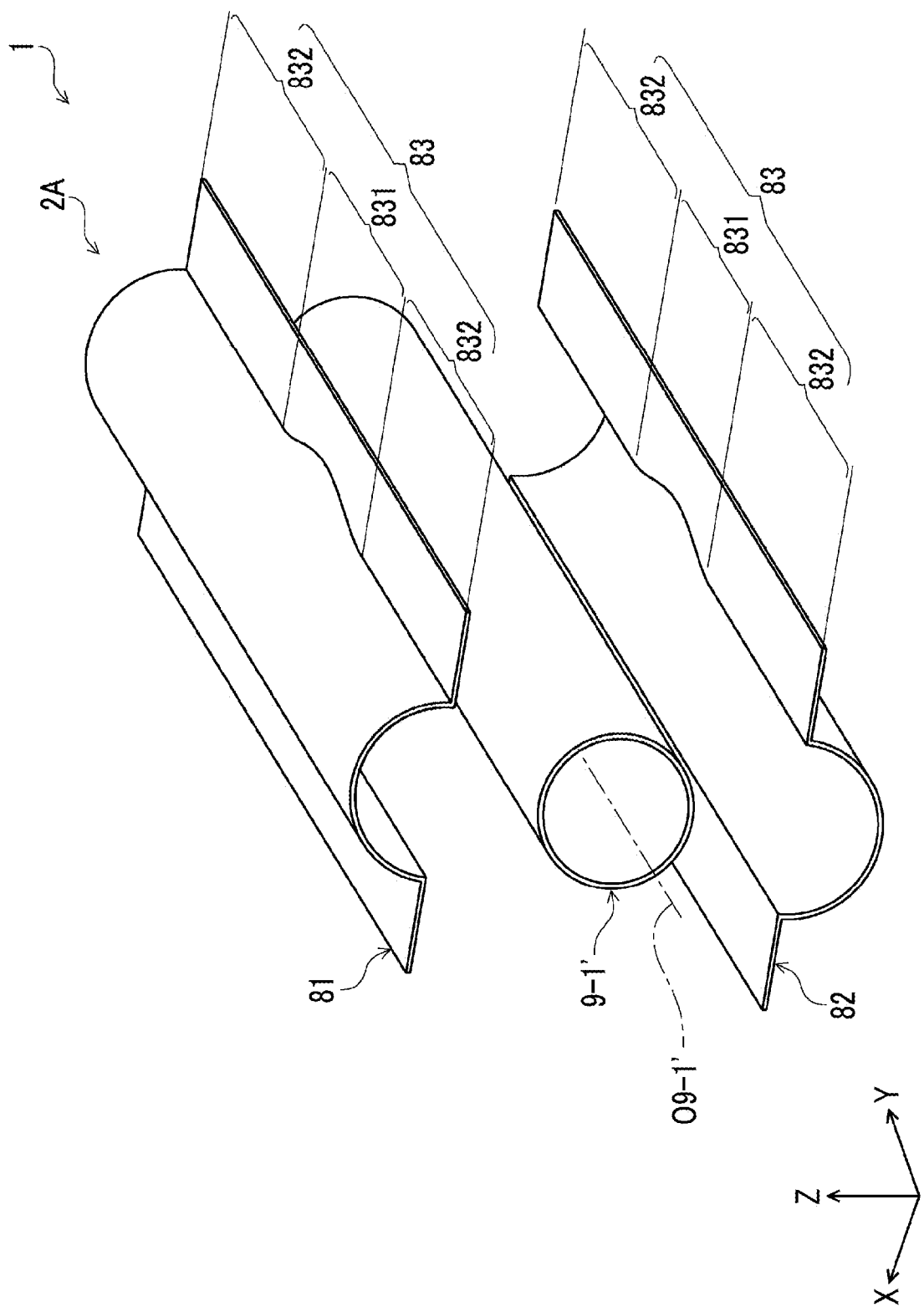
FIG. 37 is a perspective view showing an operating state (before forming an increased diameter portion) of a forming device (seventh embodiment) in turn.
Figure 38:
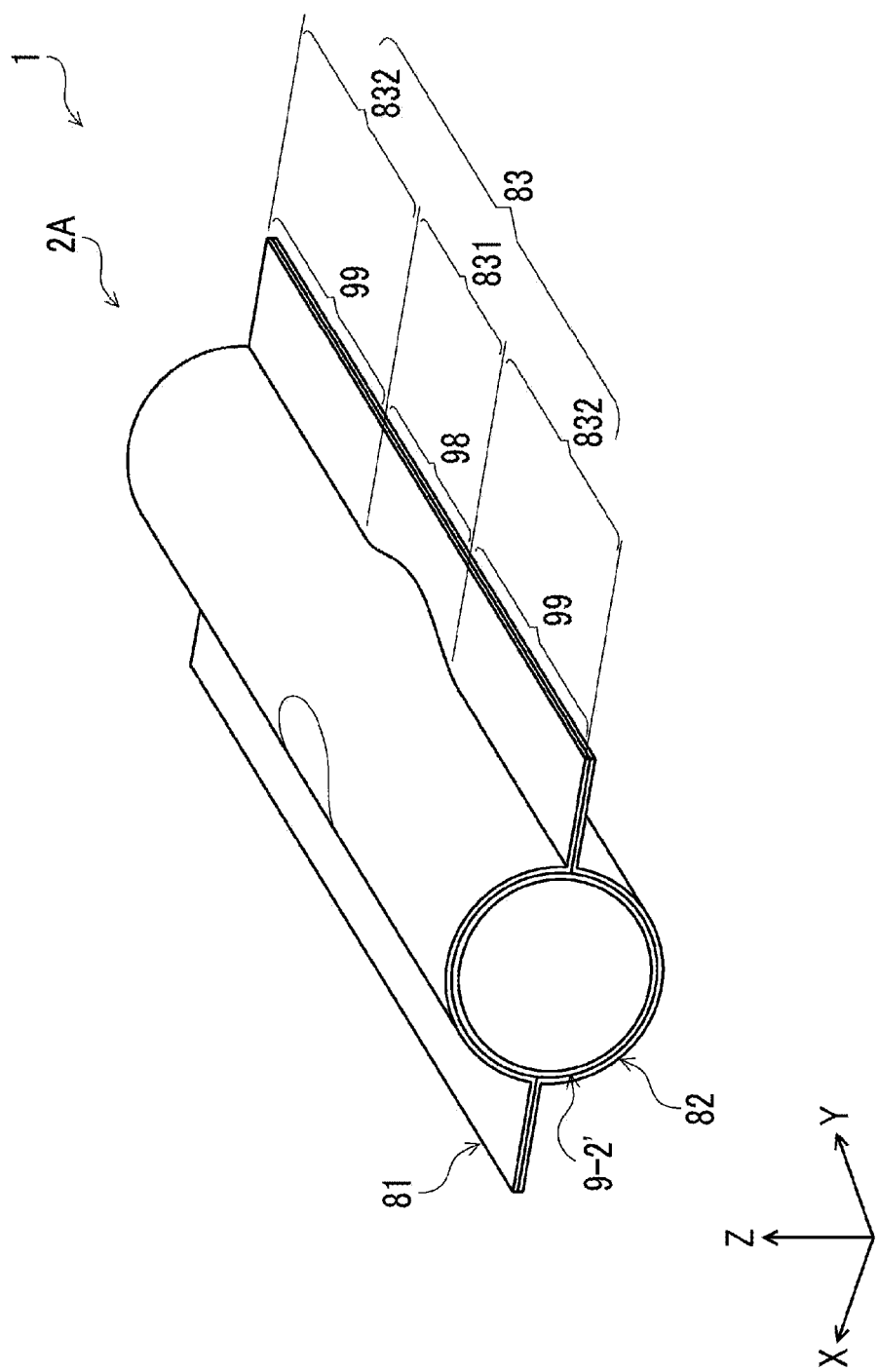
FIG. 38 is a perspective view showing an operating state (during forming of the increased diameter portion) of the forming device (seventh embodiment) in turn.

As shown in FIGS. 37 and 38, the first device main body 2A includes a first mold 81 and a second mold 82 that are supported to be capable of approaching and separating from each other.

Between the first mold 81 and the second mold 82, a cavity 83 for disposing and accommodating the primary base material 9-1' is formed. The cavity 83 is a cylindrical space and includes a large-diameter portion 831 and a small-diameter portion 832 that have diameters different from each other. In the present embodiment, the cavity 83 includes two small-diameter portions 832 and one large-diameter portion 831 disposed between the two small-diameter portions 832.

In addition, the primary base material 9-1' is a member that has a cylindrical shape and has a constant outer diameter and a constant inner diameter along a center axis O9-1' direction.

To form the primary base material 9-1' into the secondary base material 9-2' using the first device main body 2A, first, as shown in FIG. 37, in the mold open state, the primary base material 9-1' is disposed between the first mold 81 and the second mold 82, and the primary base material 9-1' is heated at it is. Next, as shown in FIG. 38, the mold clamping state is caused, and the gas supply process is performed as appropriate as in the first embodiment of the forming device. Accordingly, the secondary base material 9-2' is obtained. The secondary base material 9-2' includes a first portion 98 formed at the large-diameter portion 831 and a second portion 99 formed at each small-diameter portion 832. The first portion 98 has an outer diameter larger than the outer diameter of the second portion 99, but has the thickness of the pipe wall smaller than the thickness of the pipe wall at the second portion 99.

Figure 39:
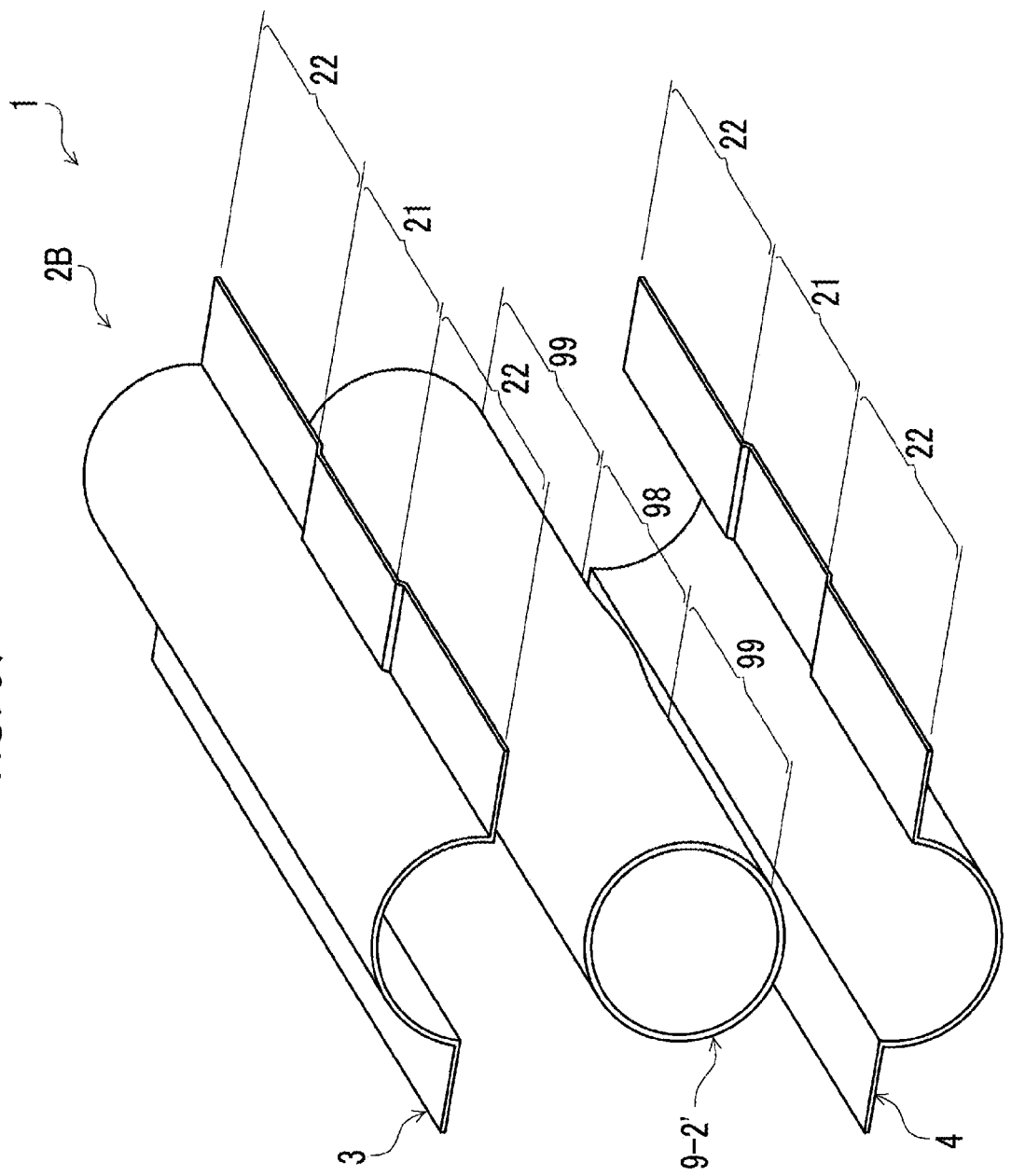
FIG. 39 is a perspective view showing an operating state (before forming the flange portion) of the forming device (seventh embodiment).
Figure 40:
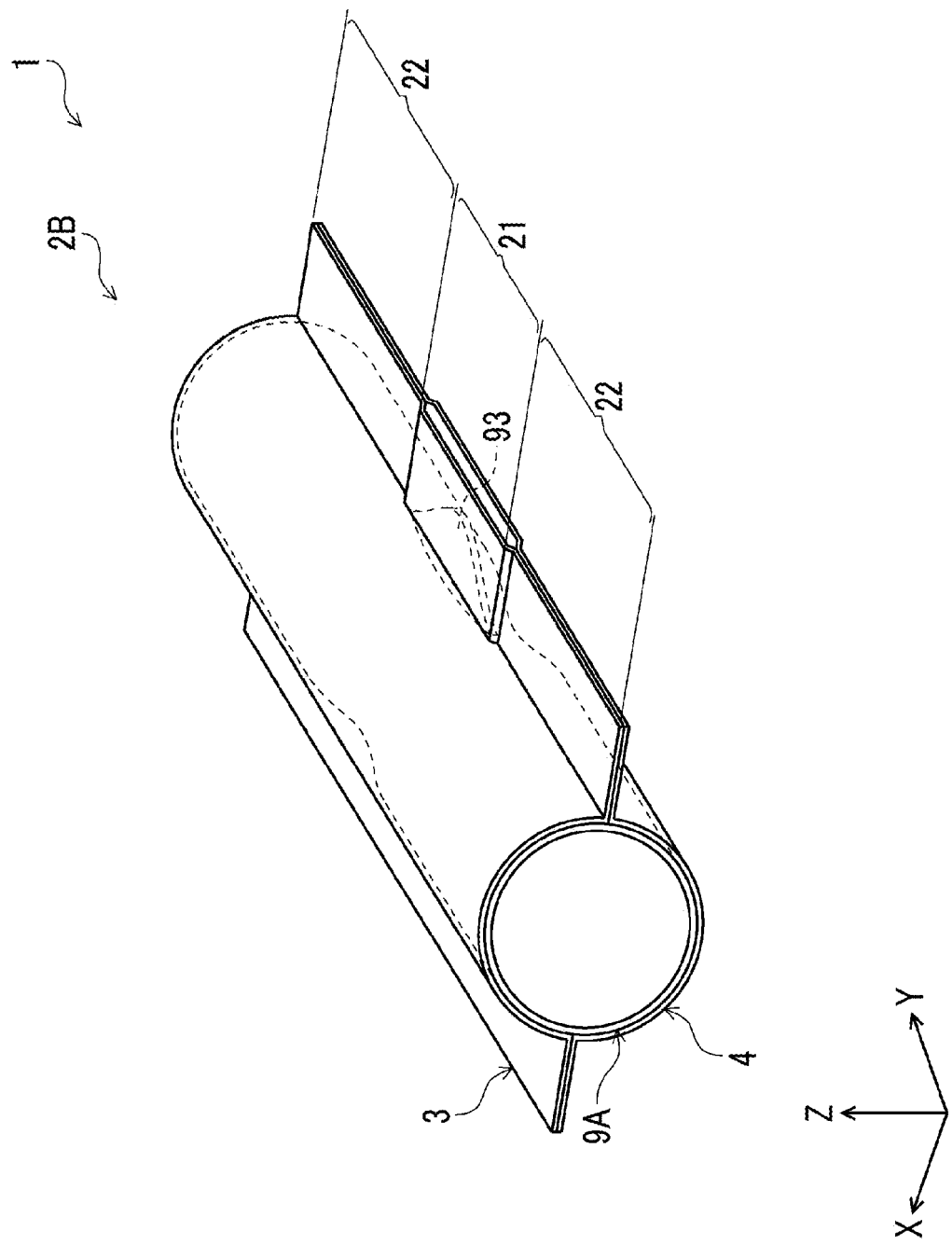
FIG. 40 is a perspective view showing an operating state (before forming of the flange portion) of the forming device (seventh embodiment).

As shown in FIGS. 39 and 40, the second device main body 2B includes the first forming portion 21 and the second forming portion 22. To form the secondary base material 9-2' into the automotive member 9A using the second device main body 2B, first, as shown in FIG. 39, in the mold open state, the secondary base material 9-2' is disposed between the first mold 3 and the second mold 4, and the secondary base material 9-2' is heated at it is. In this case, in the secondary base material 9-2', the first portion 98 faces the first forming portion 21, and the second portion 99 faces the second forming portion 22. In FIG. 40, in the first forming portion 21 at a central portion between the first mold 3, which is an upper mold, and the second mold 4, which is a lower mold, upper and lower parts of the first mold 3 (upper mold) and the second mold 4 (lower mold) are recessed (protruding) toward a central side of the secondary base material 9-2'.

Next, as shown in FIG. 40, the mold clamping state is caused, and the gas supply process is performed as appropriate as in the first embodiment of the forming device. Accordingly, the first portion 98 is crushed and spreads in the X-axis direction by the crushed amount, and the first flange portion 93 is formed. In the present embodiment, the formation of the second flange portion 94 is restricted.

Next, the second device main body 2B is again brought into the mold open state. Accordingly, as shown in FIG. 41, the automotive member 9A including the first flange portion 93 is obtained. Accordingly, since only the first flange portion 93 can be formed without forming the second flange portion 94 more than necessary, it is possible to form the flange portion 92 by the necessary protruding amount of the flange portion 92 at a necessary welding place.

In the first forming portion 21 at the central portion between the first mold 3, which is the upper mold, and the second mold 4, which is the lower mold, the upper and lower parts of the first mold 3 (upper mold) and the second mold 4 (lower mold) may not be recessed toward the central side of the secondary base material 9-2'. For example, even in a case where the first forming portion 21 has the same shape as the second forming portion 22, the first flange portion 93 can be formed by the amount that the outer diameter of the first portion 98 of the secondary base material 9-2' is larger than the outer diameter of the second portion 99.

Although the flanged member of the present invention has been described in the embodiments shown hereinbefore, the present invention is not limited thereto, and each of the units configuring the flanged member can be replaced with any configuration that can exhibit the same function. In addition, any configuration may be added.

In addition, the flanged member of the present invention may be a combination of any two or more configurations (features) of each of the embodiments.

In addition, the flanged member is applied to the automobile component in each of the embodiments, without being limited thereto, but is also applicable to, for example, an aircraft and a ship as an application example.

In addition, in a case of forming the automotive member 9B and the automotive member 9C, the formation is possible by using a forming device in which any one of the first forming portion 21 and the second forming portion 22 is omitted.

It should be understood that the invention is not limited to the above-described embodiment, but may be modified into various forms on the basis of the spirit of the invention. Additionally, the modifications are included in the scope of the invention.

What is claimed is:

1. A flanged member that is obtained by hot blow forming a tubular body, has a tubular shape, and includes a flange portion, the flanged member comprising:
a cross-section changing portion of which a cross-sectional shape changes along an axial direction of the flanged member,
wherein the cross-section changing portion includes the flange portion,
the flange portion is formed along the axial direction and has a width changing along the axial direction, and
in any two cross-sections in the cross-section changing portion, a perimeter of one cross-section is 1.25 times or less a perimeter of the other cross-section.

2. The flanged member according to claim 1, wherein the perimeter of the one cross-section is one time or more the perimeter of the other cross-section.

3. The flanged member according to claim 1, further comprising:
a rectangular portion of which a cross-sectional shape is a rectangular shape.

4. The flanged member according to claim 3, wherein the cross-section changing portion includes the rectangular portion.

5. The flanged member according to claim 3, wherein a groove along the axial direction is formed in the rectangular portion.

6. The flanged member according to claim 5, wherein a cross-sectional shape of the groove is a semi-arc shape.

7. The flanged member according to claim 3, wherein a ridge along the axial direction is formed in the rectangular portion.

8. The flanged member according to claim 1, wherein a tunnel portion is formed in the cross-section changing portion.

9. The flanged member according to claim 8, wherein a cross-sectional shape of the tunnel portion is a semi-arc shape.

10. The flanged member according to claim 1, wherein the flange portion includes a first flange portion and a second flange portion having a smaller width than a width of the first flange portion.

11. The flanged member according to claim 10, wherein in the flanged member, the first flange portion is formed at a central part in the axial direction, and the second flange portion is formed on each of both end sides of the first flange portion.

12. The flanged member according to claim 1, wherein the flange portion is a portion formed in a plate shape in which pipe walls of a tubular body overlap each other.

* * * * *